United States Patent
Campbell

[11] Patent Number: 5,810,104
[45] Date of Patent: Sep. 22, 1998

[54] DRIVE WHEEL AND TILLER FOR A PATIENT TRANSPORTER

[75] Inventor: Peter M. Campbell, Deephaven, Minn.

[73] Assignee: Patient Easy Care Products, Inc., Minnetonka, Minn.

[21] Appl. No.: 565,993

[22] Filed: Dec. 1, 1995

[51] Int. Cl.$^6$ .................................................. B62D 51/04
[52] U.S. Cl. ...................... 180/19.3; 180/19.2; 180/332; 180/333; 74/489
[58] Field of Search ............................. 180/12, 13, 19.1, 180/19.2, 19.3, 332, 333; 74/488, 489; 280/DIG. 11; 414/921

[56] References Cited

U.S. PATENT DOCUMENTS

| | | | |
|---|---|---|---|
| 2,878,884 | 3/1959 | Schreck | 180/13 |
| 3,823,616 | 7/1974 | Houseman et al. | 74/471 |
| 3,896,892 | 7/1975 | Kohls et al. | 180/19 H |
| 3,938,820 | 2/1976 | Nabinger | 280/47.11 |
| 4,106,583 | 8/1978 | Nemeth | 180/19.3 |
| 4,117,561 | 10/1978 | Zamotin | 5/83 |
| 4,123,740 | 10/1978 | Palmer et al. | 338/67 |
| 4,144,713 | 3/1979 | Clark et al. | 60/447 |
| 4,202,063 | 5/1980 | Murray | 5/81 R |
| 4,484,366 | 11/1984 | Koontz | 5/86 |
| 4,709,771 | 12/1987 | Basham et al. | 180/6.5 |
| 4,800,328 | 1/1989 | Bolger et al. | 320/2 |
| 4,878,554 | 11/1989 | Dion | 180/19.3 |
| 4,936,160 | 6/1990 | Barnard et al. | 74/489 |
| 4,942,352 | 7/1990 | Sano | 320/2 |
| 5,049,802 | 9/1991 | Mintus et al. | 320/2 |
| 5,064,010 | 11/1991 | Masbruch et al. | 180/6.5 |
| 5,077,844 | 1/1992 | Twitchell et al. | 5/87 |
| 5,185,895 | 2/1993 | Gagne et al. | 5/86.1 |
| 5,249,800 | 10/1993 | Hilgendorf et al. | 273/138 A |
| 5,264,776 | 11/1993 | Hulsey | 320/2 |
| 5,323,099 | 6/1994 | Bruni et al. | 320/2 |
| 5,327,065 | 7/1994 | Bruni et al. | 320/2 |
| 5,341,083 | 8/1994 | Klontz et al. | 320/2 |
| 5,367,242 | 11/1994 | Hulman | 320/2 |
| 5,370,017 | 12/1994 | Krauer | 74/489 |
| 5,379,468 | 1/1995 | Cassidy | 5/86.1 |

Primary Examiner—Brian L. Johnson
Assistant Examiner—Avraham Lerner
Attorney, Agent, or Firm—Janal M. Kalis

[57] ABSTRACT

A device for controllably moving a vehicle that includes a drive wheel. The device includes a drive motor that provides energy for moving the drive wheel, a steering tiller conjoined to the drive wheel for changing vehicle direction and a control grip attached to the steering tiller for increasing and decreasing power to the drive motor. The present invention also includes a control grip.

3 Claims, 19 Drawing Sheets

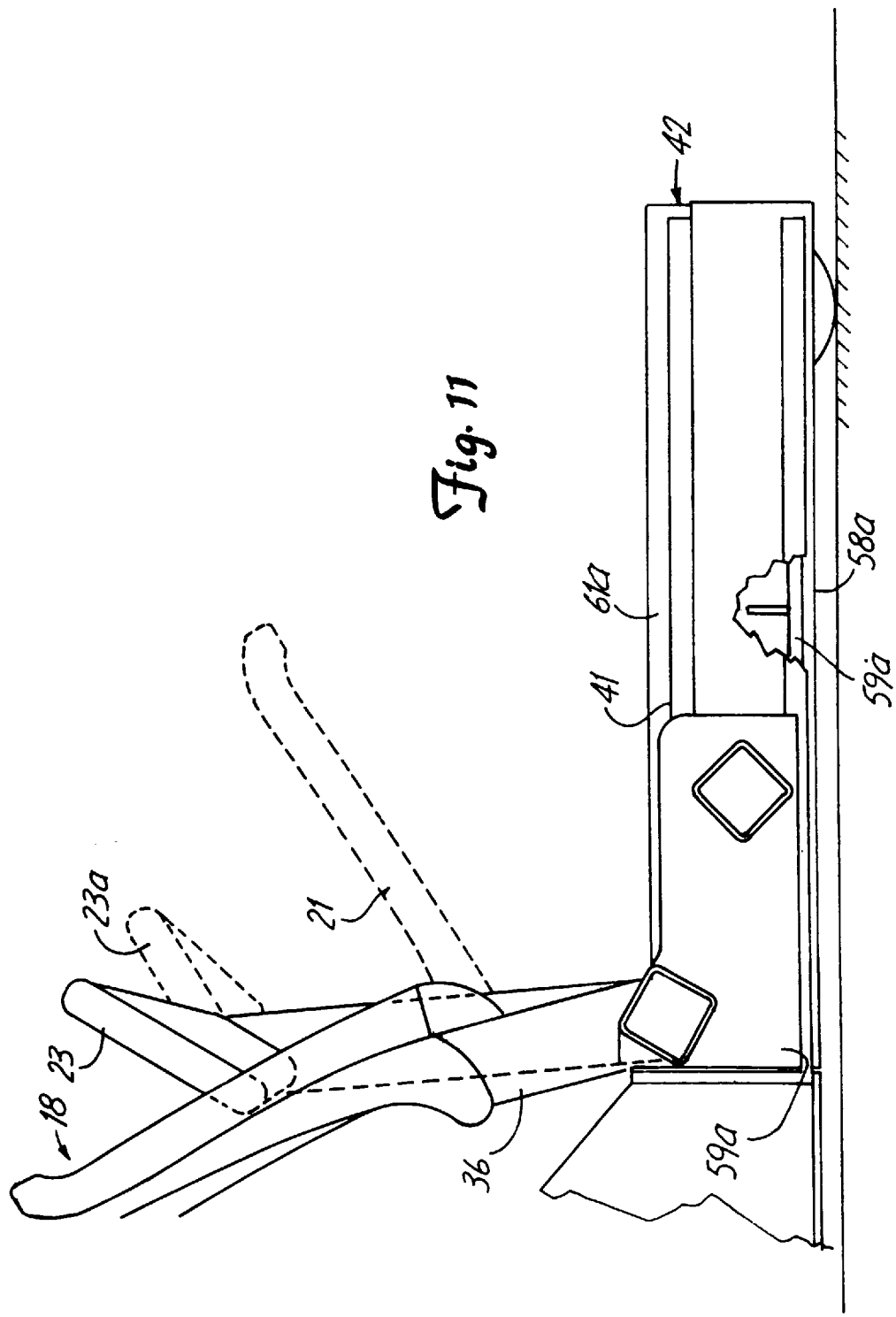

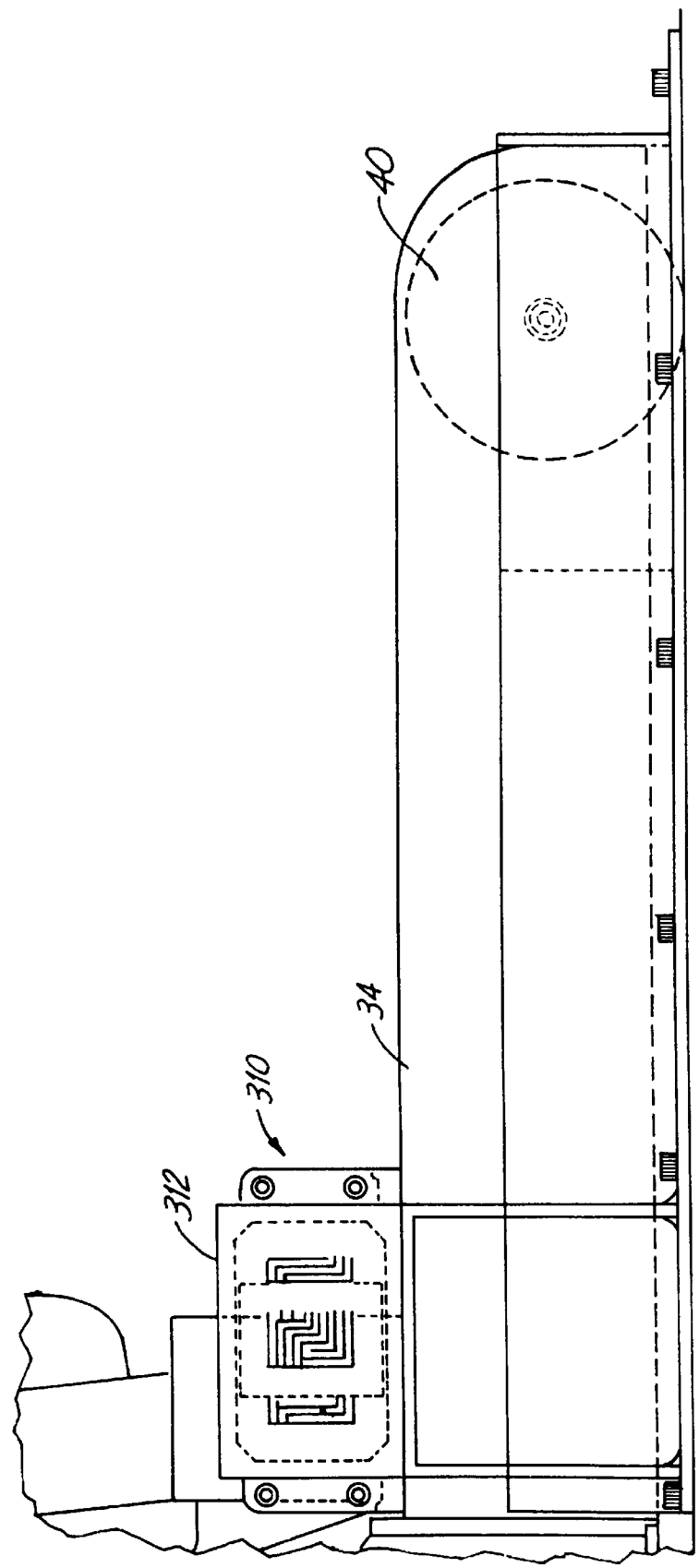

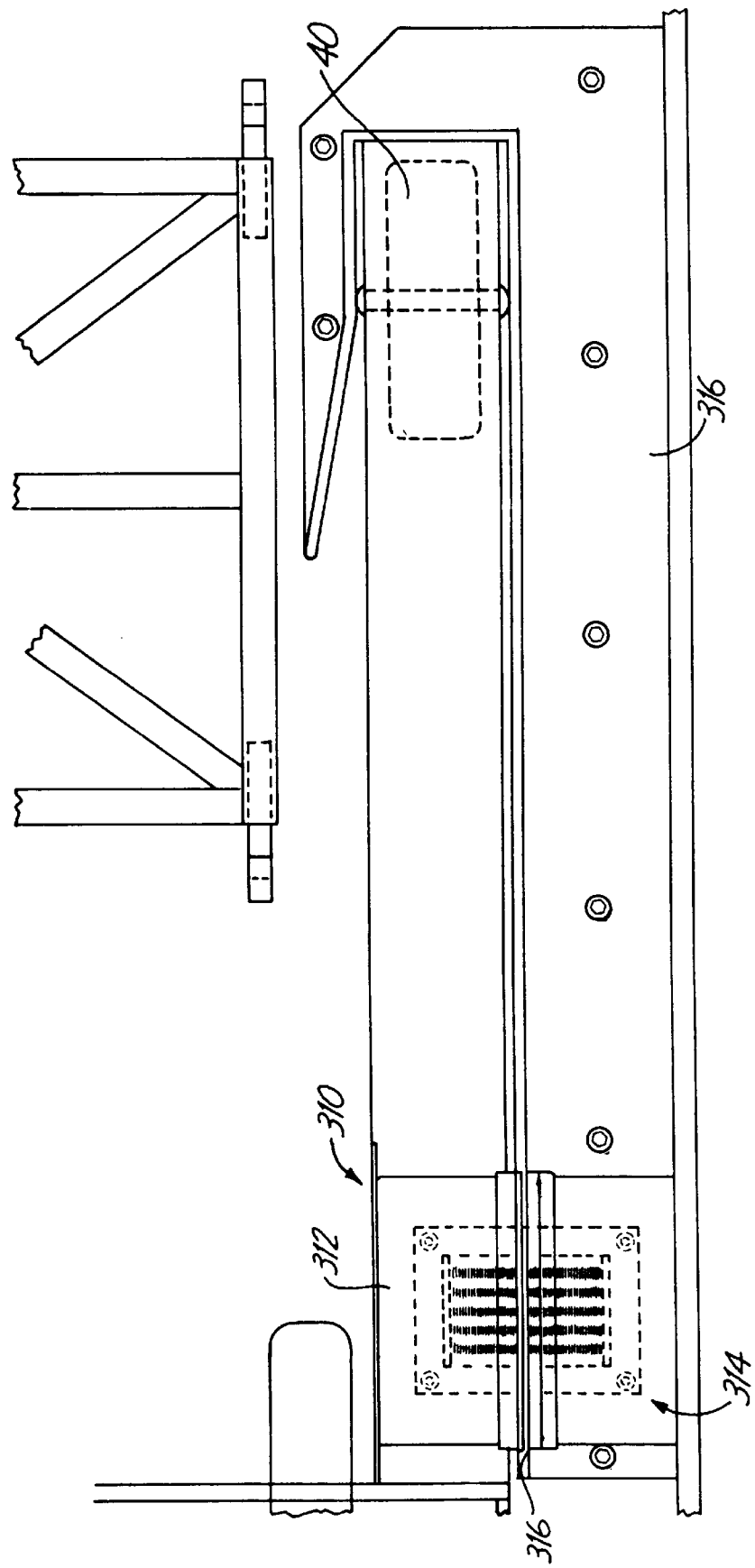

DRIVE WHEEL AND TILLER FOR A PATIENT TRANSPORTER

Reference is made to the following applications which are filed on even date with this application and are assigned to the same assignee: Patient Transporter, Control Panel, and Battery Charger.

BACKGROUND OF THE INVENTION

The present invention relates to a device for lifting and transporting living beings, particularly for lifting and transporting bedridden patients.

Among the most difficult tasks encountered in a hospital or nursing home environment are the tasks of lifting and moving bedridden patients. Lifting and moving bedridden patients causes many work-related injuries and places great physical stress upon staff members who perform these tasks. The risk for injury may be increased when staff members lift relatively heavy patients. The risk of injury extends to patients as well as staff. Patients may be accidentally dropped. Elderly patients may incur injuries such as a dislocated shoulder when improperly lifted and moved.

These lifting and moving tasks make even simple chores such as changing bedding difficult because the bedridden patient cannot move from the bed. Lifting and moving the bedridden patient to assist the patient in performing bathroom and personal hygiene functions are then complicated procedures that may require several staff members.

One other area where lifting and moving can be difficult is in a manufacturing facility where production space is limited. The manufacturing facility environment may require an individual to lift more weight than he or she can or should be called upon to lift, such as liquid containers or subassemblies. Overhead cranes may not available.

The Cassidy et al. patent, U.S. Pat. No. 5,379,468 describes a patient handling apparatus that includes an upright post having a top end and a support arm having an inner end adjacent to the upright post. The support arm is coupled to the top end of the post about a pivot point. The support arm is movable between a continuum of cantilevered positions with respect to the post. A patient is suspendible in the air from the support arm. The patient is movable across the length of the support arm from an outer end of the support arm to the upright post.

The Clark et al. patent, U.S. Pat. No. 4,144,713, describes a patient lifting device that includes an upright member, a boom pivotally mounted on the upright member, a fluid cylinder, one end of which is connected to the upright member. Another opposing end is connected to the boom. A manually operated pump operates with the fluid cylinder so that the operation of the pump causes actuation of the cylinder. Actuation of the cylinder moves the patient up and down with respect to the boom.

The Murray patent, U.S. Pat. No. 4,202,063, describes a hollow beam that is supported in cantilever fashion at one end on a frame and has laterally spaced rail flanges along its lower edges. A carriage with rollers on each corner is supported on the rail flanges. A cable drum extends longitudinally along the carriage and is rotated relative to the carriage. A shaft having a square cross section extends through the drum and the carriage is rotatably supported at its ends by the beam.

This patient lifting device permits movement of a patient from a first position along the hollow beam to the other end adjacent to the frame.

The Gagne et al. patent, U.S. Pat. No. 5,185,895, issued Feb. 16, 1993, describes an apparatus for lifting and transporting an invalid that includes a base frame, wheels affixed to the base frame, vertically oriented guide posts affixed to the base frame, a carriage assembly slidably coupled to the guide posts, an actuator for moving the carriage along the guide posts in response to an operator applied control signal, an arm projecting out from the carriage having patient support attachment coupled at a distal end of the arm and a mechanism for causing the arm to telescope reversibly from a retracted position to an extended position.

The Zamotin patent, U.S. Pat. No. 4,117,561, issued Oct. 3, 1978, describes a movable patient lift device that includes a lower base assembly, an upstanding post assembly mounted on one end of the base assembly, a cantilever boom assembly which includes a track mounted on the upper end of the post. The track extends longitudinally at the distal end beyond the base assembly and a movable trolley assembly.

The Koontz patent, U.S. Pat. No. 4,484,366, issued Nov. 27, 1984, describes an invalid transfer device that includes a base with a front end and a rear end, the front end having a narrower width than the rear end. The rear end includes a pair of rear wheels having a larger diameter than a pair of front wheels that are coupled to the front end. The rear end carries a control unit adapted to impart movement to the rear wheels. A vertical support extends upwardly from the rear end, a boom member extends outwardly from the vertical support in the direction of the front end. A connecting link couples to the vertical support and the boom support to fixedly dispose the boom member relative to the vertical support.

An anti-sway assembly extends outwardly from the vertical support in the direction of the front end. A carrier assembly is adapted to carry the invalid above the front end and a cable extends from the carrier assembly to the control unit.

SUMMARY OF THE INVENTION

The present invention includes a device for controllably moving a vehicle that includes a drive wheel. The device includes a drive motor that provides energy for moving a drive wheel, a steering tiller conjoined to the drive wheel for changing vehicle direction, and a control grip attached to the steering tiller for increasing and decreasing power to the drive motor.

The present invention also includes a control grip that can be manipulated by a human hand. The control grip includes a potentiometric main body for acceleration control of a motor, and a control shaft that encloses the main body. The control shaft moves clockwise and counterclockwise about the main body.

DESCRIPTION OF THE DRAWINGS

FIG. 11 shows a side view of one manual embodiment of a chair support and guide mechanism.

FIG. 18 shows a side view of an induction panel on the transporter for battery charging.

FIG. 19 shows a top elevational view of the transporter and induction battery charger in a charging position.

DETAILED DESCRIPTION OF PREFERRED EMBODIMENTS

Figure 1:
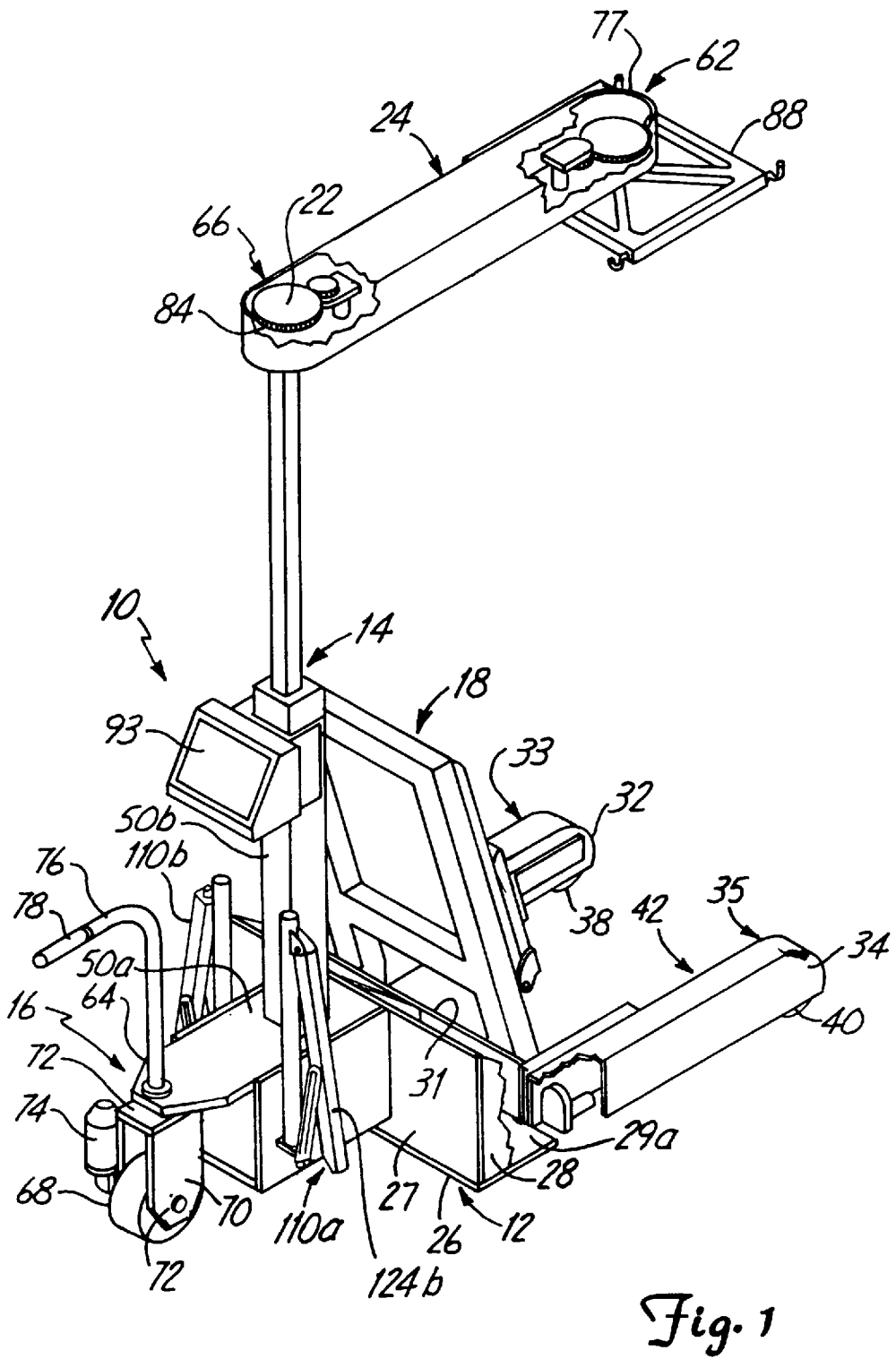
FIG. 1 shows a front perspective view of one embodiment of the transporter of the present invention free of a shroud.

The transporter of the present invention illustrated generally at 10 in FIG. 1 includes a frame 12, a vertical lift mechanism 14, a chair 18 and chair moving mechanism 42, each attached to the frame 12, an arm 24 and arm pivotal movement assembly 66 attached to the vertical lift mechanism 14, a swivel movement assembly 62 attached to the arm 24, and a drive assembly 16 that moves the frame 12. The present invention also includes a battery charging device illustrated at 310 in FIGS. 18 and 19 for charging the transporter 10.

The transporter 10 of the present invention transports patients to remote locations without requiring any lifting efforts by others. The transporter 10 is easily controlled by a single person and is highly maneuverable into a position for lifting a patient from a bed. The transporter 10 is power driven and maneuverable throughout facilities such as hospitals, nursing homes and domestic environments. The transporter 10 is easily maintainable and ready for use at all times.

The transporter 10 provides a lifting and seating arrangement that controllably lifts and positions a patient from a prone position to a seated position for transport. The transporter 10 also has an ability to pivot the patient in a seated position for transport. The transporter 10 further has an ability to pivot the lifting arm 90 degrees left and right so as to deposit the patient in a chair, toilet, bath or any location, place or position desired.

Figure 2:
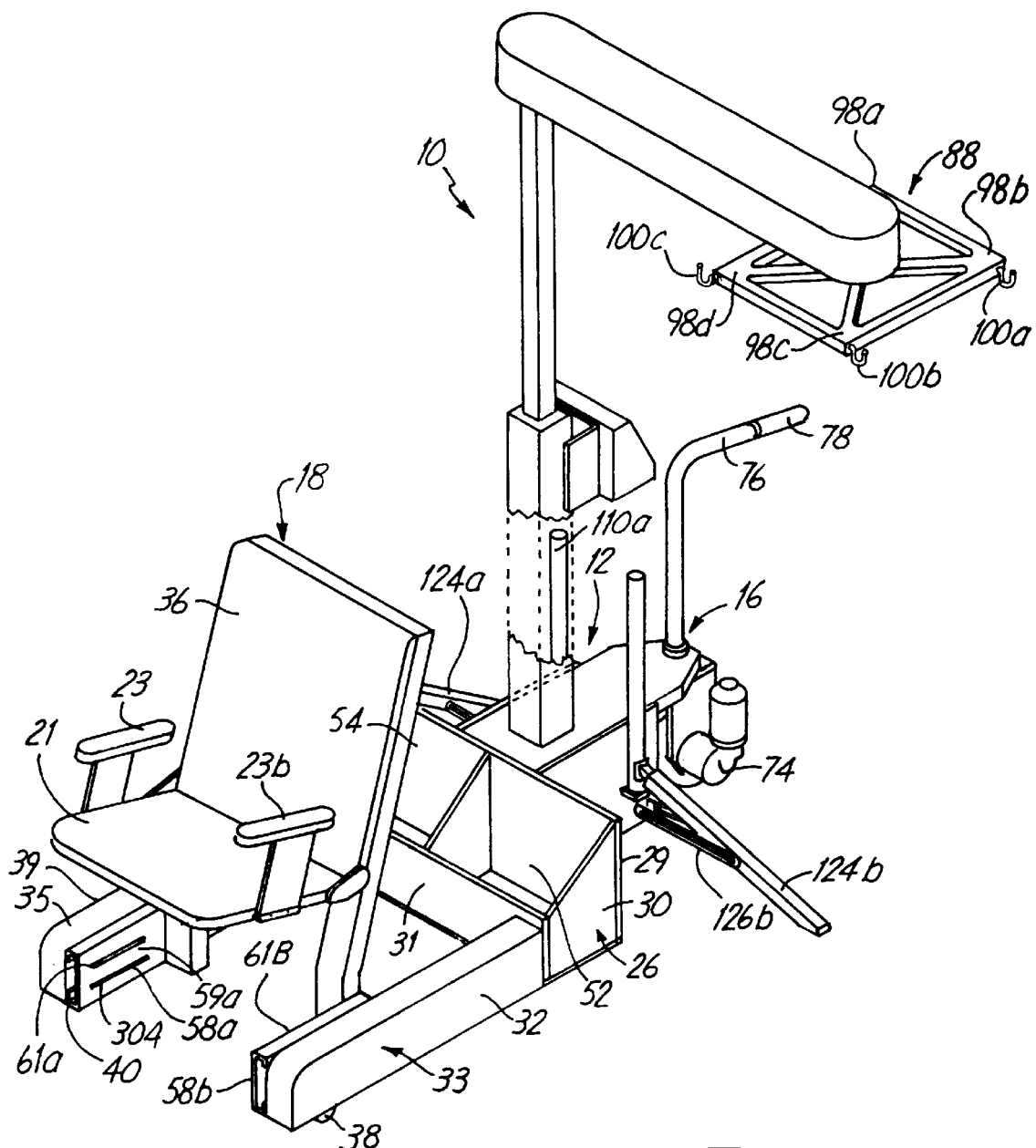
FIG. 2 shows a rear perspective view of one embodiment of the transporter of the present invention free of a shroud.

The chair 18 of the transporter 10 is movable on a track component 58a and 58b, such as is illustrated in FIGS. 2 and 11 of the chair moving mechanism 42, once the transporter 10 is at rest. With this arrangement, the patient may be moved from the chair 18 while in a patient sling 95 to a toilet as shown in FIG. 10D, bed as shown in FIG. 10B, shower as shown in FIG. 10E, a stationary chair, operating table or an MRI table. Thus, the patient may be moved in longitudinal and radial directions, once the transporter 10 is at rest, while the patient is in a stable, comfortable position.

Figure 15:
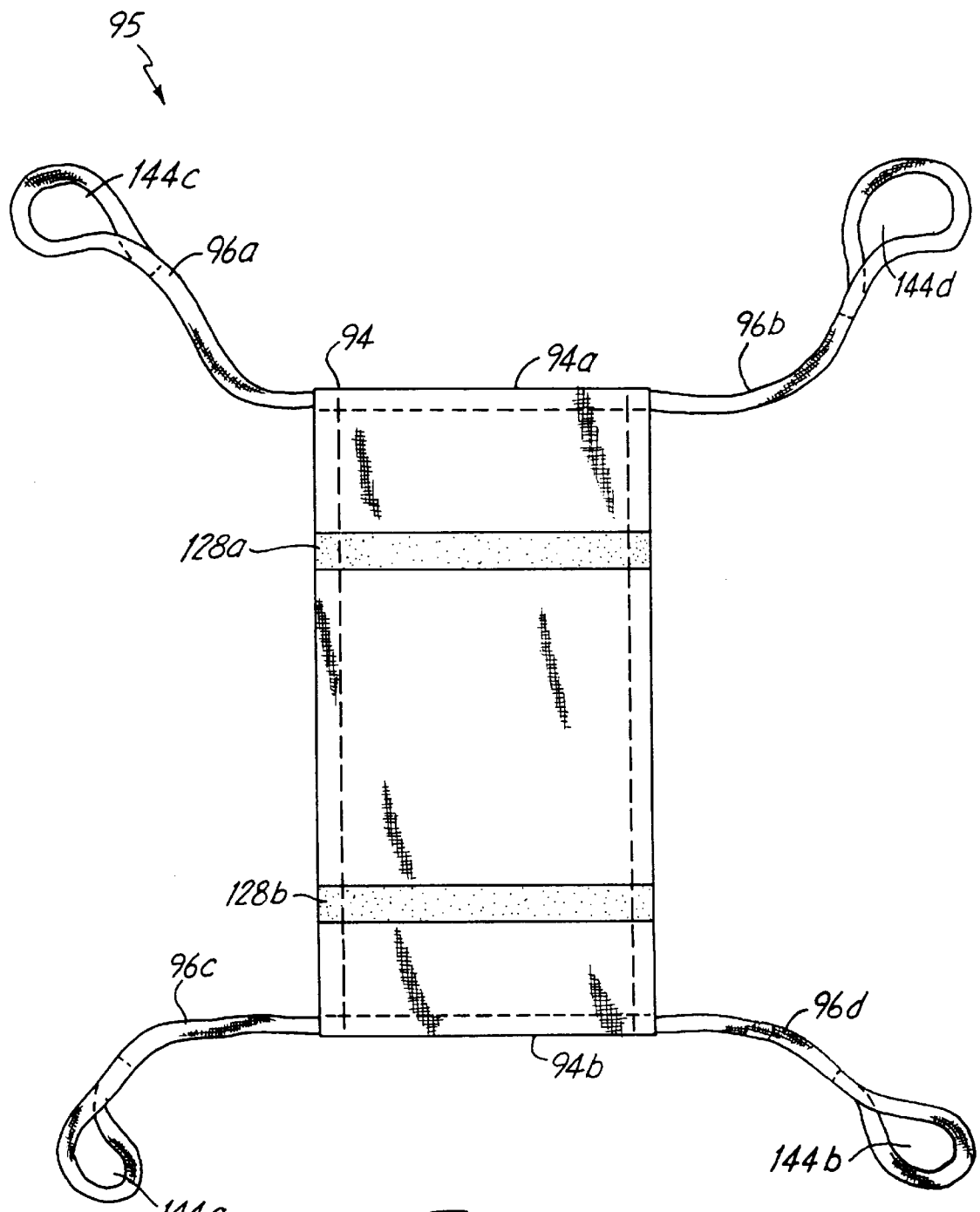
FIG. 15 shows a plan view of one embodiment of a sling component of the transporter of the present invention.

One other feature of the device 10 of the present invention is that the patient sling 95 is attached to the swivel movement assembly 62 with sling straps 144a–d shown in FIG. 15 suspended from a sling strap spreader 88. The sling strap spreader 88 is attached to the swivel movement assembly 62 at a swivel column 25 shown in FIG. 9. As a consequence, the incapacitated individual is not "pinched together" when in the sling 95 but is able to semi-recline in a comfortable position.

Figure 5:
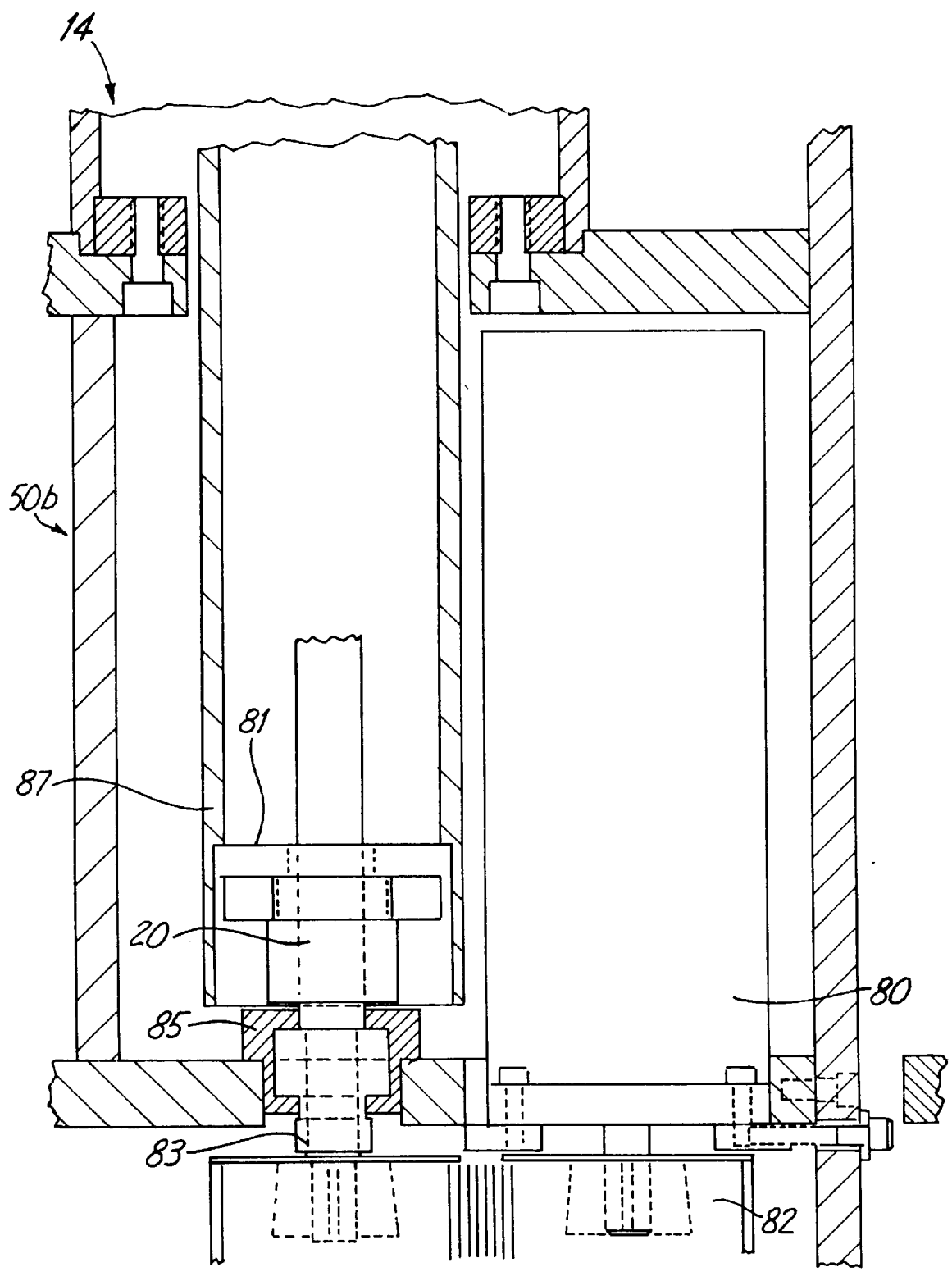
FIG. 5 shows one side bottom view embodiment of a vertical lift mechanism of the present invention.

One additional feature of the transporter 10 of the present invention is that an incapacitated individual may be elevated as a consequence of axial movement of an Acme screw component 20, shown in FIG. 5 of the vertical lift mechanism 14. Further, the individual may be pivoted about an axis 22 by pivotal movement of the lift arm 24. The patient may also be swiveled about the swivel column 25 moved by the swivel movement assembly 62.

As a consequence, the device 10 may be used to perform tasks heretofore unheard of such as aiding the patient on the toilet, in the shower, and into and out of bed.

The transporter device 10 may be moved over a lateral distance by actuation of a drive wheel 68 through manual operation of a steering tiller 76 attached to the drive wheel 68 at a drive wheel axle 72. The steering tiller 76 includes a control grip 78. The control grip 78 controls a drive motor 74, shown in FIG. 2, that drives the drive wheel 68. The steering tiller 76 and control grip 78 permit one-handed operation of the transporter 10.

Figure 4:
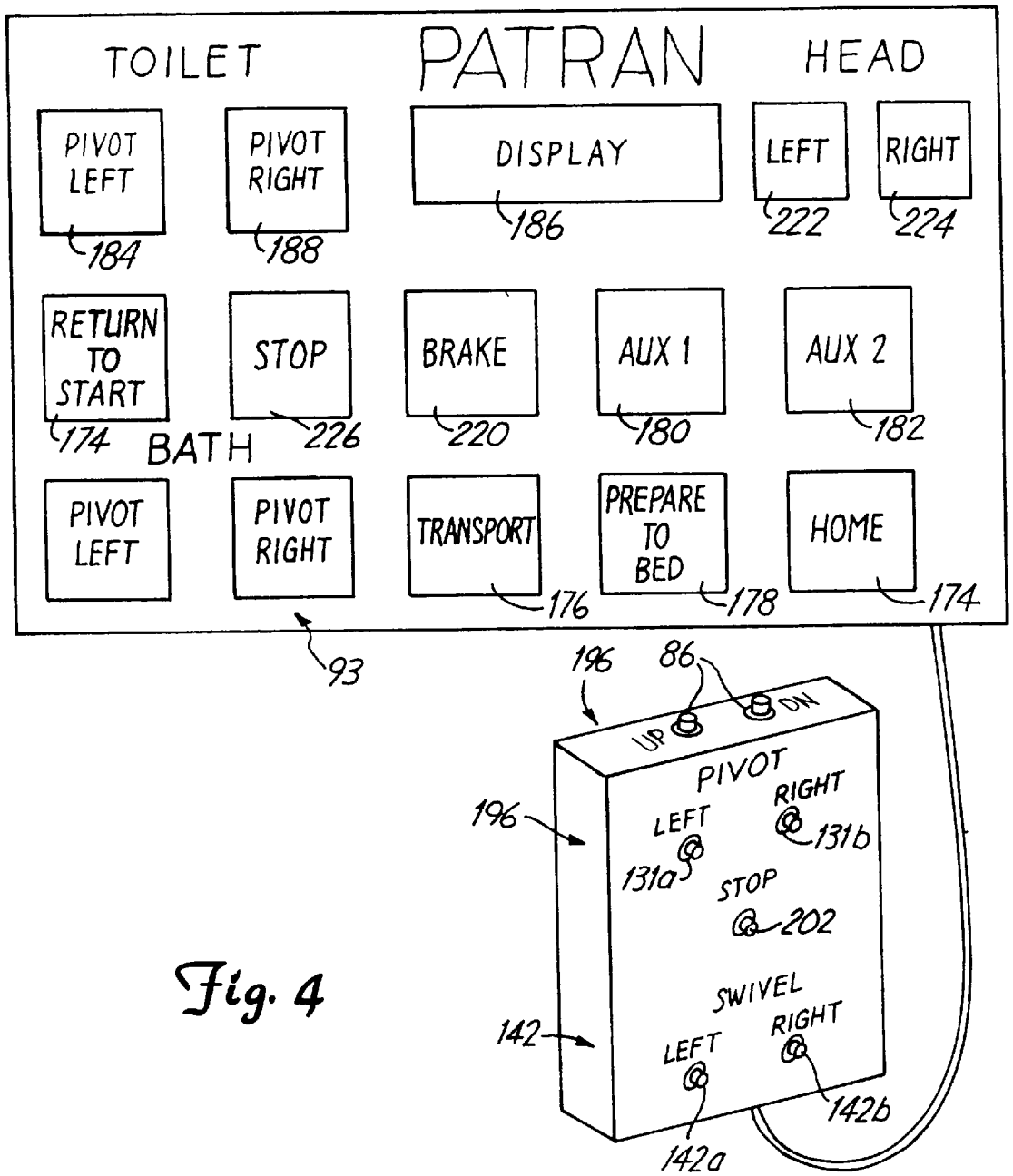
FIG. 4 shows a plan view of one embodiment of an control panel.

In one transporter embodiment, the chair 18 is manually movable along the track 42 shown in FIG. 11. The vertical lift mechanism 14 may be automatically controlled either by telemetric actuation or by another automatic mode such as by touching an actuator, such as 184 as shown in FIG. 4, on the control panel 93 to actuate a program. In one other embodiment, the vertical lift mechanism 14 may be actuated by manual operation of an UP/DOWN switch 86 on a tethered hand control 196 as shown in FIG. 4. The arm movement pivotal assembly 66 and swivel assembly 62 may also be manually actuated by touching switches 131a and 131b and 142a and 142b, respectively, on the tethered hand control 196.

The vertical lift mechanism 14, pivotal assembly 66, swivel assembly 62 and stabilizers 110 of the transporter 10 may be pre-programmed to act in concert and automatically controlled to perform tasks historically unheard of for any type of transporter device. For instance, the vertical lift mechanism 14, pivotal assembly 66 swivel assembly 62 and stabilizers 110*a* and 110*b* of the transporter device 10 may be pre-programmed to pre-position the patient so that the patient may be transferred to a bed, to a shower and so on. In pre-programming the various assemblies and mechanisms of the transporter 10, care can be taken to insure that an incapacitated person is safely and precisely positioned over a bed or a chair or toilet. In particular, the mechanisms and assemblies of the transporter 10 can be programmed to move and precisely position the incapacitated individual. Further, the mechanisms can be timed to perform functions rapidly, as required, and to permit manual adjustment of a patient, as required.

Figure 12:
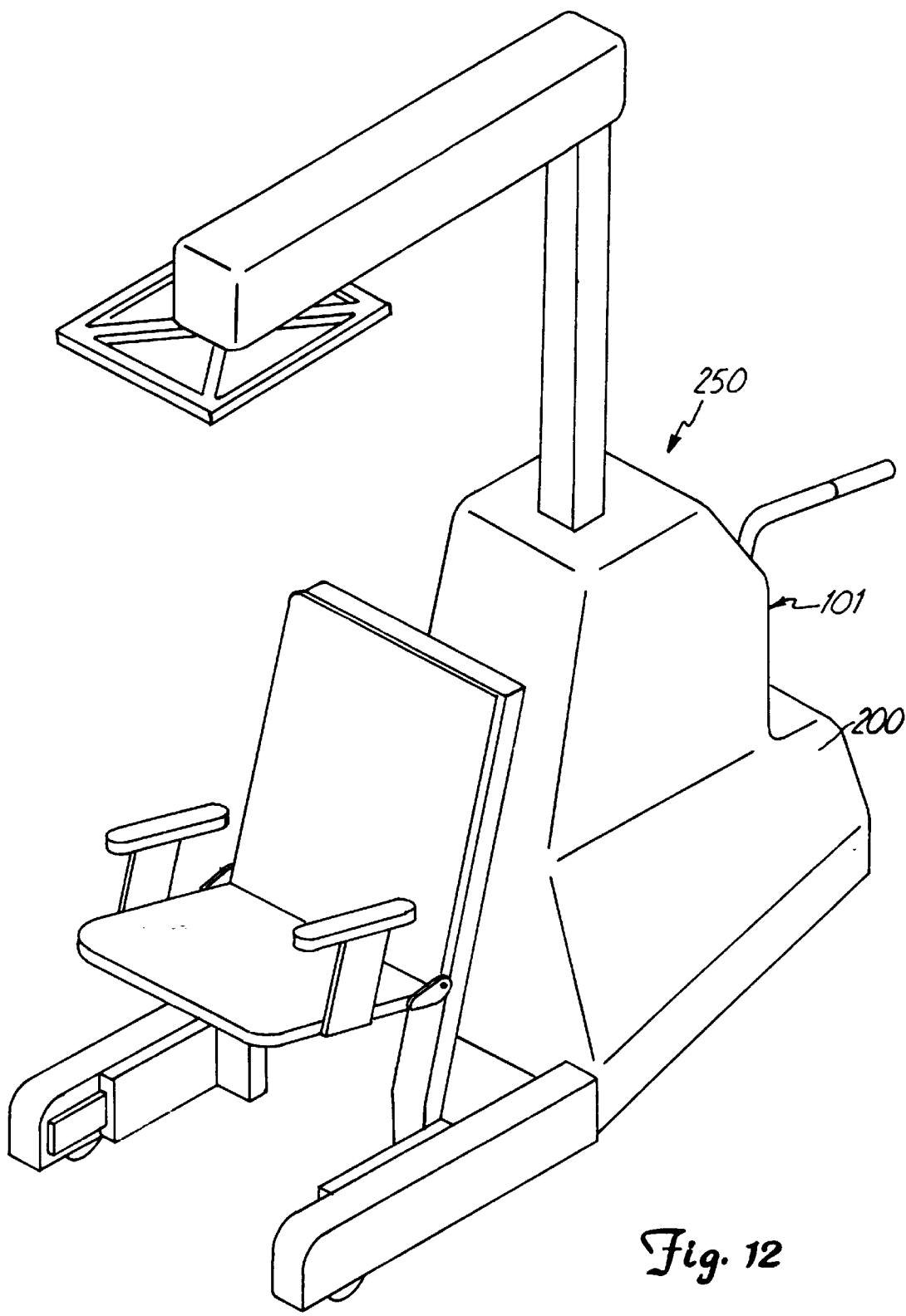
FIG. 12 shows a rear view of a shrouded embodiment of the transporter of the present invention.

Tasks that may be preprogrammed include those shown in FIGS. 10A through 10E. The transporter device 10 shown in FIGS. 10A–E includes a shroud 101 that covers the frame 12. One embodiment of a shrouded transporter is shown at 250 in FIG. 12. In one embodiment, the shroud 101 is made of fiberglass. The shroud 101 includes a centering marker 200 that permits an attendant to position the pre-programmed transporter 10 to perform tasks.

The frame 12 of the transporter 10 includes a bracket 26 with parallel walls 29 and 31 attached to a floor 29*a*. The floor 29*a* is a structural component of the frame 12. The wall 31 includes opposing ends 28 and 30 as shown in FIG. 2. Wheel legs 33 and 35 are attached to the wall 31 proximal to ends 28 and 30. Axles, which are not shown, are attached to each of the wheel legs 33 and 35. Wheels 38 and 40, shown in FIG. 2, are supported on the axles. The wheels 38 and 40 are movable in a forward and reverse direction.

Each of the wheel legs 33 and 35 includes one of two wheel housings 32 and 34, that enclose the wheel legs 33 and 35. Each one of the wheel housings of 32 and 34 is attached to the wall 31 and extends outwardly from the wall 31 such as is shown in FIG. 2. Each wheel housing 32 and 34 encloses one of the axles, not shown, that supports one of two front wheels 38 and 40.

The bracket 26 encloses compartments 52 and 54, shown in FIG. 2, for holding batteries between walls 29 and 31. Also attached to the bracket 26 are housings 50*a* and 50*b* that enclose the vertical lift mechanism 14. The lift mechanism housing 50*a* provides a site of attachment for the pair of stabilizers 110*a* and 110*b*. The lift mechanism housing 50*b* encloses an Acme screw 20 and motor 80, shown in FIG. 5, that drives the Acme screw 20. The lift mechanism housings 50*a* and 50*b* as well as the frame 12 are preferably made of structural steel.

As discussed, the transporter 10 has a great versatility with respect to movement. In addition to the movable chair 18, these degrees of freedom of motion are imparted by the drive assembly 16, the vertical lift mechanism 14, the arm pivotal movement assembly 66 and the swivel movement assembly 62.

The drive assembly 16 includes a drive frame 64 conjoined to the lift mechanism housing 50*a*, the drive wheel 68 attached to the drive frame 64 by a wheel frame 70 with the axle 72, and drive motor 74. In one embodiment, the drive wheel 68 is larger than either of the front wheels 38 and 40. In another embodiment, the drive wheel 68 is about the same size as the front wheels 38 and 40. The distribution of weight of the transporter 10 does not require that a larger drive wheel 68 be used.

The drive motor 74 is controlled by the steering tiller 76 with the control grip 78. Energy from the drive motor 74 is transmitted through a drive shaft (not shown) to the drive wheel 68. The drive shaft rotation is adjustable by a conventional gear box assembly. The drive shaft rotation may be halted by a conventional solenoid braking device that is not shown. As discussed, the steering tiller 76 with the control grip 78 is connected to the drive wheel 68 at the axle 72.

Figure 13:
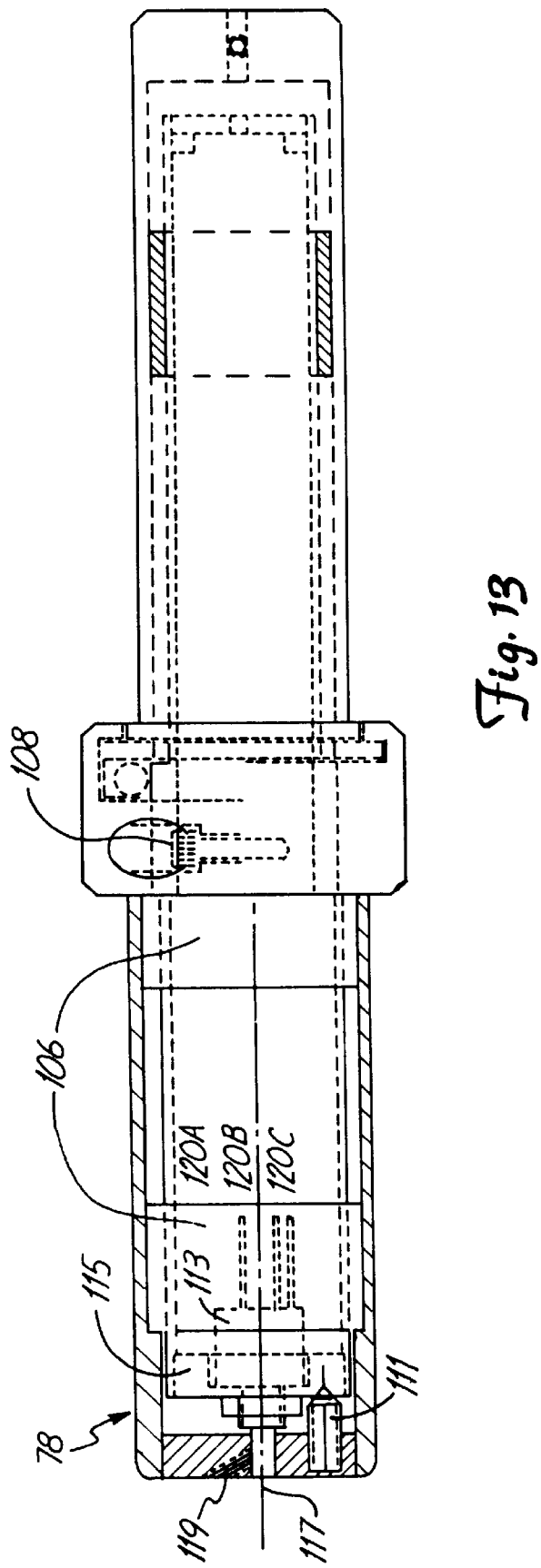
FIG. 13 shows a plan view of one embodiment of a grip control mechanism of the present invention.

The handgrip control 78 is shown in greater detail in FIG. 13. The handgrip 78 is attached to the steering tiller 76 by pressed on bearings 106 that are enclosed by the handgrip 78. The bearings 106 are held in place by a lip (not shown) machined on an inside of the handgrip 78. In one embodiment, a spring 108 keeps the handgrip 78 under tension when either clockwise or counter clockwise twisting force is applied to the grip 78. The spring 108 biases the handgrip 78 to a neutral position in the absence of the twisting force. It has surprisingly been found that a single spring provides a better handgrip manipulation in both clockwise and counter-clockwise directions than dual springs.

Figure 17A:
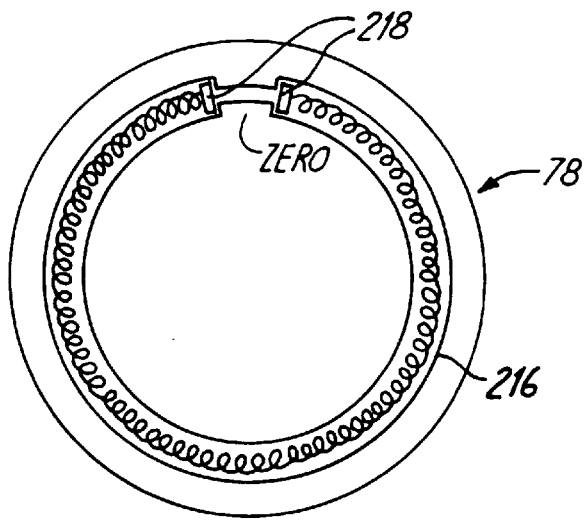
FIG. 17A shows a cross-sectional view of the grip control mechanism with a full spring coil.
Figure 17B:
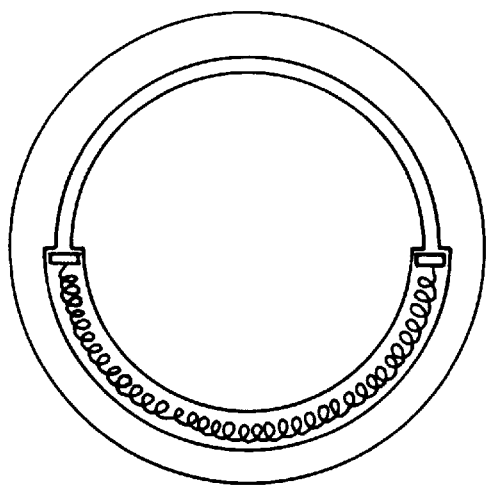
FIG. 17B shows a cross-sectional view of the grip control mechanism with a half spring coil.
Figure 17C:
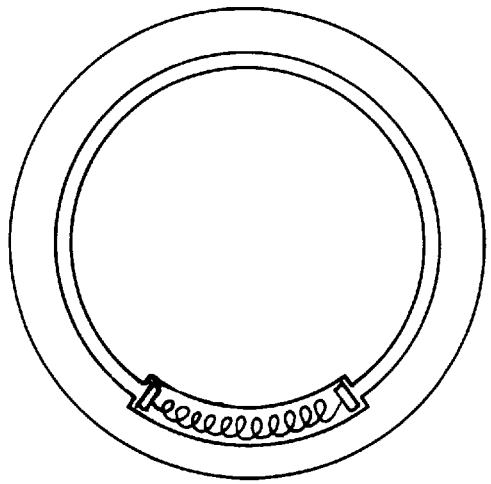
FIG. 17C shows a cross-sectional view of the grip control mechanism with a quarter spring coil.

The handgrip 78 is held under tension by the single full coil spring 108, shown in cross-section in FIG. 17A. The handgrip may be locked in a zero power position by mechanical stops 218 when the coil is fully coiled, as shown in cross-section in FIG. 17A. The handgrip 78 may also be held under tension by half coil and quarter coil positions such as are shown in FIGS. 17B and 17C, respectively.

A detent 111 holds the grip 78 in a center position when not under tension. An acceleration control potentiometer body 113 is held in a fixed position to the tiller 76 by a threaded nut 115. A variable control shaft 117 is held in place by a set screw 119 to the rotatable hand grip 78. The result is to allow a clockwise grip rotation to turn the variable control shaft 117, changing the electrical characteristics of voltage relationship among the output leads 120A, 120B and 120C which are fed into a bidirectional phase sensitive voltage amplifier having an output that drives a DC motor drive control which powers the drive motor 74. The drive motor 74 powers the drive wheel 68 through a gear reducer that is not shown.

A counter-clockwise rotation of the grip 78 results in propelling the transporter 10 in a reverse direction. In both directions of rotation, the more degrees of rotation, the greater the acceleration and speed.

The vertical lift mechanism 14 includes the Acme screw 20, a translating element 81 for translating axial motion to upward and downward motion, a vertical mast 87 coupled with the translating element 81, and the lift mechanism housing 50*a* and 50*b*, that is positioned to enclose the screw 20, translating element 81, and vertical mast 87, as shown in FIG. 5.

The vertical lift mechanism 14 also includes the lift motor 80 and a belt drive 82 intertied to the lift motor 80. The lift motor 80 transmits energy to the Acme screw 20 by the belt drive 82 that is attached to a drive shaft 83 rotated upon activation of the motor 80. The drive shaft 83 is coupled to the Acme screw 20 by a coupling 85. The lift motor 80, when actuated, powers the drive shaft 83 and axially moves the Acme screw 20 by a transmission of energy to the drive shaft 83 and coupling 85.

In one embodiment, the Acme screw 20 has a stroke of about 36 inches in order provide a clearance sufficient to position an individual into and out of a bed. It is also contemplated that the Acme screw stroke may be greater than or less than 36 inches.

The translating element 81 transforms the rotational movement of the Acme screw 20 to an upward or downward direction, depending upon whether the screw 20 is moving clockwise or counter-clockwise. The translating element 81 includes a basket 300 that encloses an array of cam followers 302, shown in FIG. 6. The cam followers 302 are symmetrically arranged, as shown in cross-section in FIG. 7, to stabilize the vertical mast 87. The basket 300 remains stationary.

Figures 6, 7:
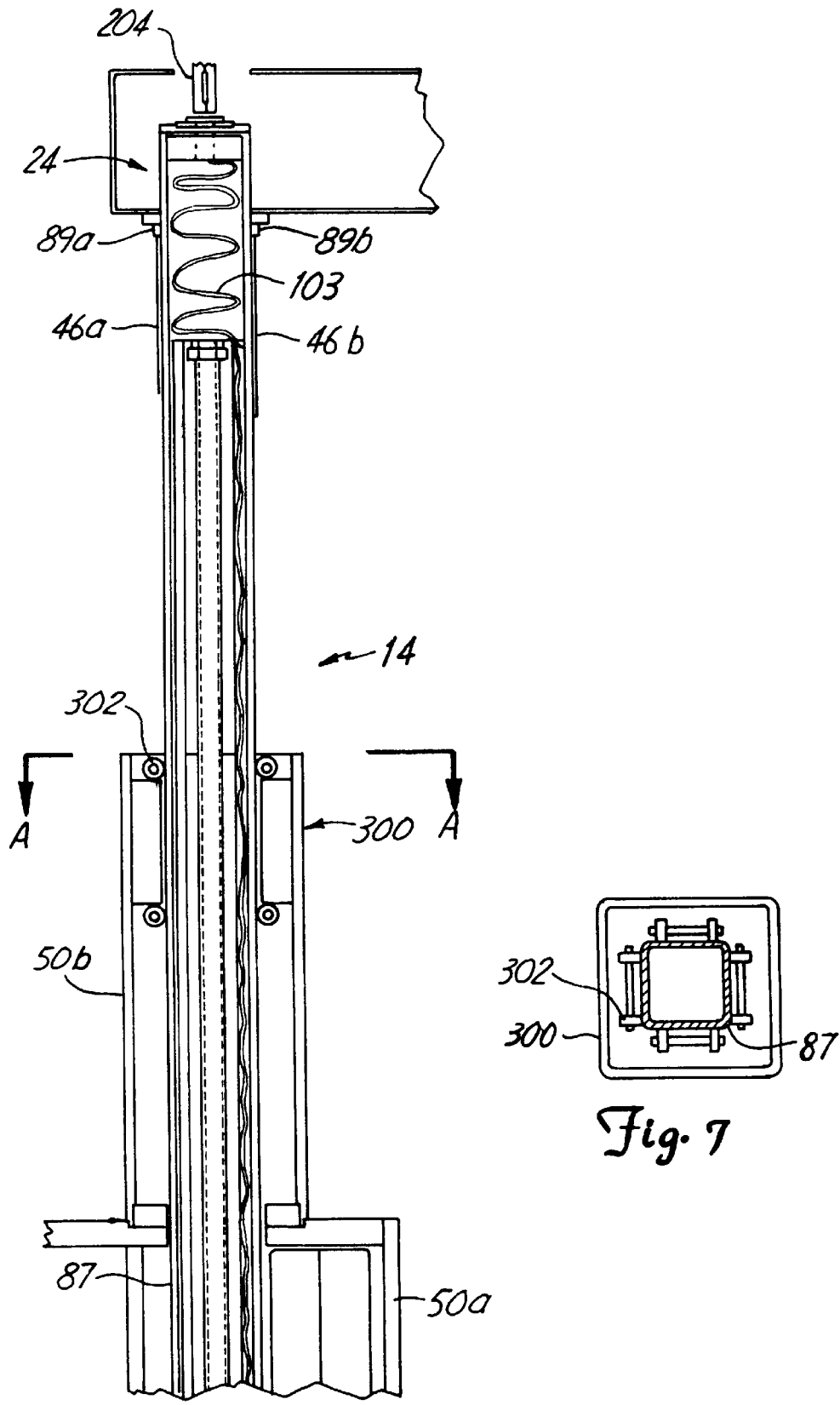
FIG. 6 shows a side view of the vertical lift mechanism of the transporter of the present invention.
FIG. 7 shows a cross-sectional view of the vertical lift mechanism as taken at line A—A in FIG. 6.

Preferably, the vertical mast 87 has a rectangular shape which is shown as a square in cross-section in FIG. 7. The vertical mast 87, attached to the translating element 81, is also moved in an upward and downward direction.

Movement of the Acme screw 20 may be stopped by limit switches. If one of the limit switches fails, the turning screw 20 will increase resistance on the motor 80. The increased resistance will be detected by a current limiter (not shown) which will turn the motor 80 off. The limit switches as described herein may be mechanical limit switches but are preferably optical-type limit switches.

In one embodiment, the lift motor 80 is actuated by a switch (not shown) that is tethered to the motor 80 and that is manually operated. It is also contemplated that the motor 80 may be automatically actuated by the switch 86 on the tethered control panel 196 as shown in FIG. 4 or as a step of one of the programs of control panel 93.

Figure 8:
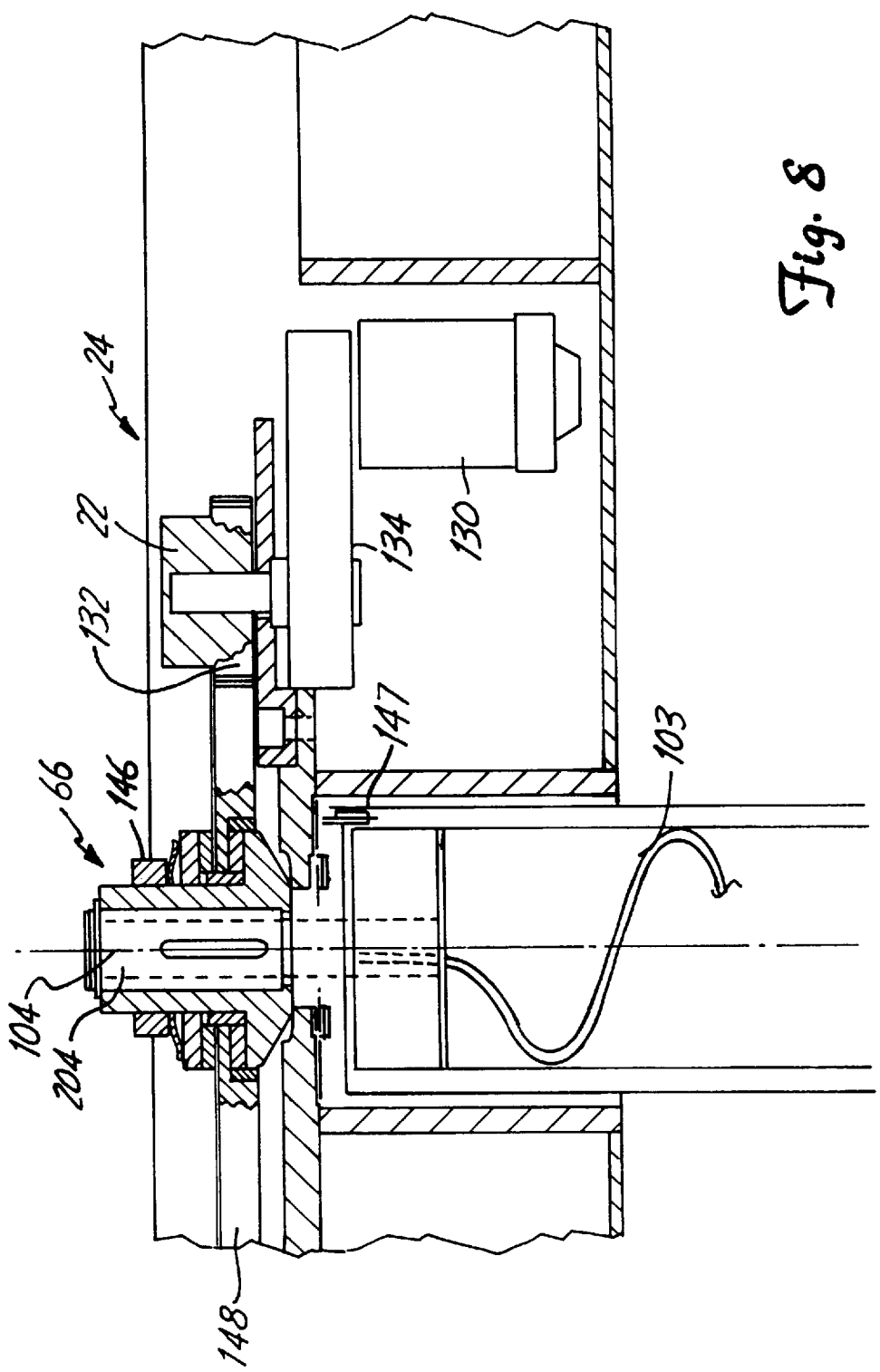
FIG. 8 shows a side view of one embodiment of the pivoting mechanism and the vertical lift mechanism of the present invention.

The pivotal movement assembly 66 shown in FIG. 8 includes the lift arm 24, drive shaft 204 that drives the lift arm 24, and the pivot motor 130 that supplies power to drive the drive shaft 204. The power is transmitted by a gear system that includes a gear reducer 134, a small gear 132 conjoined to the gear reducer 134 and a large gear 148 attached to the drive shaft 204 and contacting the small gear 132. Gear stripping is prevented by the torque limiter 22 that is coupled to the lift arm 24 when actuated.

The movement of the lift arm 24 is radial and is in alignment with an axis 104 of the Acme screw 20. In one embodiment, the lift arm 24 has a range of motion of plus or minus 90 degrees. Movement of the lift arm beyond 90 degrees is prevented by a limit switch and, as a backup, mechanical stops 89a and 89b, shown in FIG. 6. The lift arm 24 contacts and is perpendicular to the Acme screw housing 50b as is shown in FIG. 6.

The pivot motor 130 is, in one embodiment, of a fractional horsepower, such as one-eighth of one horsepower. Other motors in the transporter 10 may also have a power that is a fraction of one horsepower. It is also contemplated, however, that the transporter motors have power that is greater than one horsepower.

As the arm 24 rotates, the bedridden patient is in the sling 95. It is important that the individual not be jerked about by a fast rotating movement.

Figure 16:
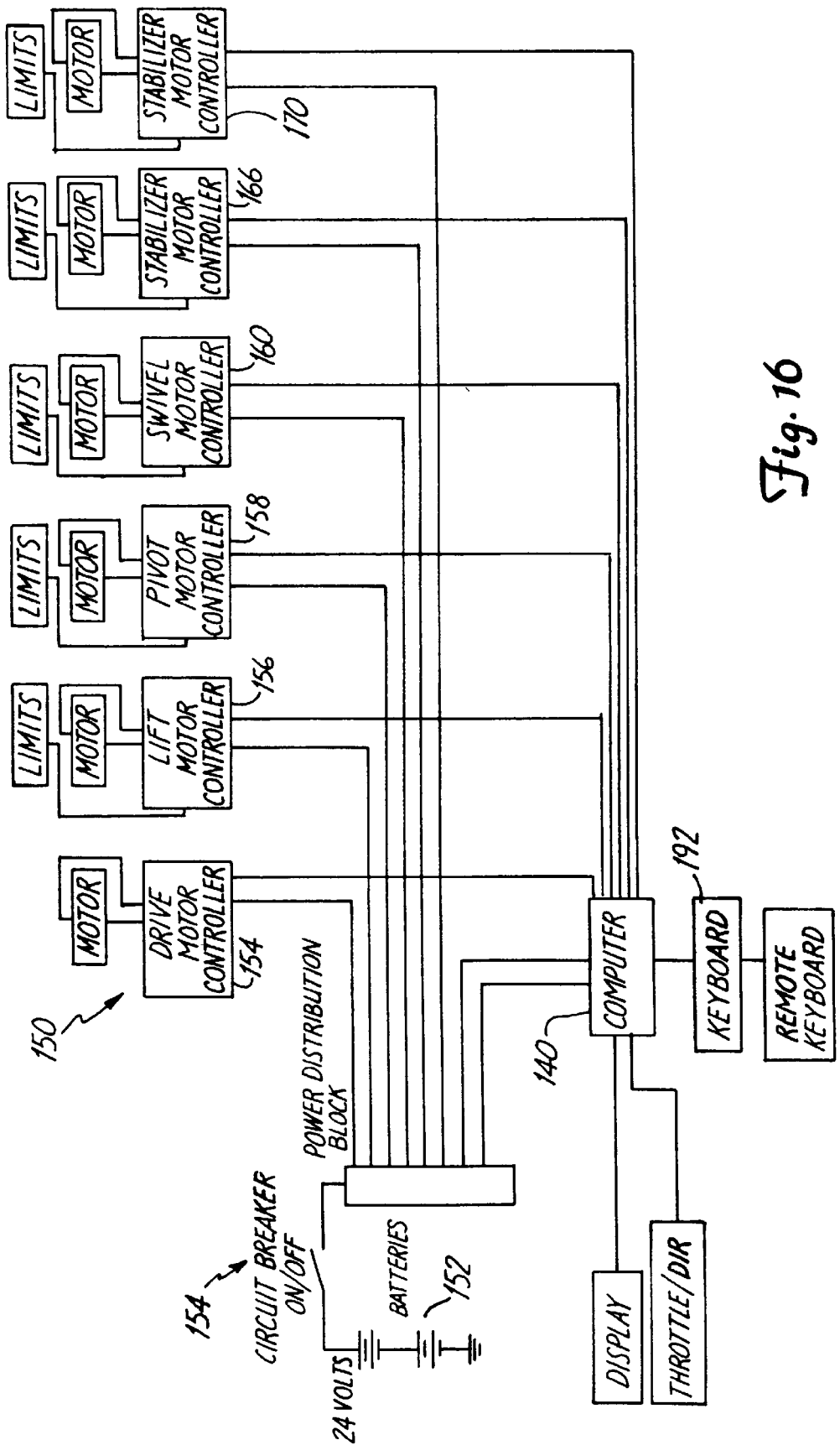
FIG. 16 is a schematic view of one power distribution embodiment for the transporter of the present invention.

The pivot motor 130 may be manually actuated by an individual pressing one of the pivot actuator buttons 131a and 131b on the tethered control panel 196 shown in FIG. 4. The pivot motor 130 may also be automatically actuated by a programmed computer that is shown schematically at 140 in FIG. 16. The program is initiated by pressing one of the actuators on the control panel 194.

As discussed, the torque limiter 22 acts as a safety mechanism for preventing gear stripping, shown in FIG. 8. The torque limiter 22 decouples the gear reducer 134 from the pivot motor 130 when subjected to a horizontal force. The horizontal force causes movement of the torque limiter 22 instead of the gear reducer 134. Thus, integrity of the gear reducer 134 is preserved.

The pivot motor 130 is powered through a coiled wire 103 that is passed from the translator element 81 and through the Acme screw housing 50b. The coil 103 is self-directed into a conduit 46a or 46b at the translator element 81. Above the translation element 81, the wire is coiled and uncoiled to accommodate movement of the translator element 81 and screw 20 as shown in FIG. 6.

The lift arm 24 includes an opposing end 79 that opposes end 84 shown in FIG. 1. The sling strap spreader 88 for the sling 95, shown in FIG. 15, is attached to the transporter 10 at the opposing end 79 of the lift arm 24. The lift arm 24 also supports the swivel column 25 at the opposing end 79. The sling strap spreader 88 is attached to the swivel column 25.

Figure 9:
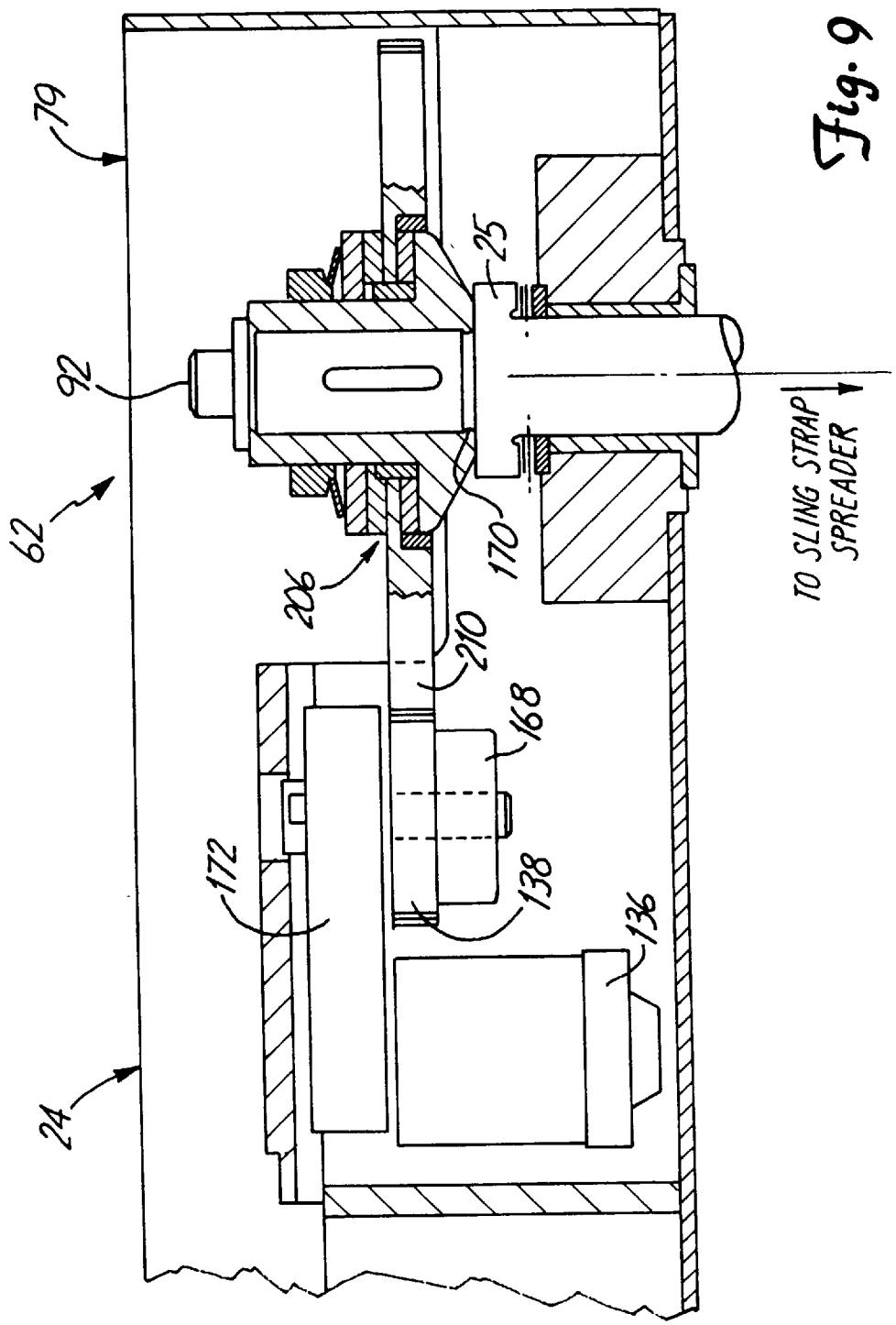
FIG. 9 shows a side view of one embodiment of the swivel mechanism of the present invention.

The swivel column 25, shown in FIG. 9, is powered by the swivel column motor 136 and powers movement of the sling strap spreader 88 and the sling 95, not shown in FIG. 9. A gear assembly 206 that includes a gear reducer 172, a small gear 138 attached to the gear reducer and a big gear 210 contacting the small gear 138 transmits energy from the swivel column motor 136 to the swivel column 25. A torque limiter 168 prevents stripping of gears. The gear reducer 172 modulates power from the swivel column motor 136.

The swivel column motor 136 may be manually actuated by an individual pressing one of the swivel switches 142a and 142b on the tether control panel 196 as shown in the FIG. 4. The swivel motor 136 may also be automatically actuated by the computer that is shown schematically at 140 in FIG. 16, pre-programmed to actuate the swivel column motor 136. The swivel motor 136 is powered through a wire passing through the lift arm housing.

The swivel column motor 136 may be of a power that is less than one-half horse power. As the swivel column 25 rotates, the bedridden patient is in the sling 95. The combination of gears and choice of motor permits smooth motion.

The sling strap spreader 88 moves radially about the swivel column 25 shown in FIG. 9. The sling strap spreader 88 includes a frame with four corners 98a–d, as shown in FIG. 2. A hook 100a–d (100d is not shown) is attached to each corner.

In one embodiment, the sling 95 shown in FIG. 15 includes a sling body 94 with a front side 94a and a rear side 94b, that opposes the front side 94a. Two sling straps 96a and 96b are attached to the front side 94a. Two sling straps 96c and 96d are attached to the rear side 94b. The sling straps 96a and 96b are typically longer than sling straps 96c and 96d in order to orient a disabled individual so that he or she is in a semi-reclined position. The sling straps 96a–d each terminate in a loop 144a–d. The loop 144a–d is attachable to the hooks 100a–d of the sling strap spreader 88.

In one embodiment, two straps 128a and 128b are attached to the sling 95. The straps 128a and 128b may be extended about an individual's chest and thighs in order to hold the individual in place. The straps are made of a material such as Velcro.

Figure 3:
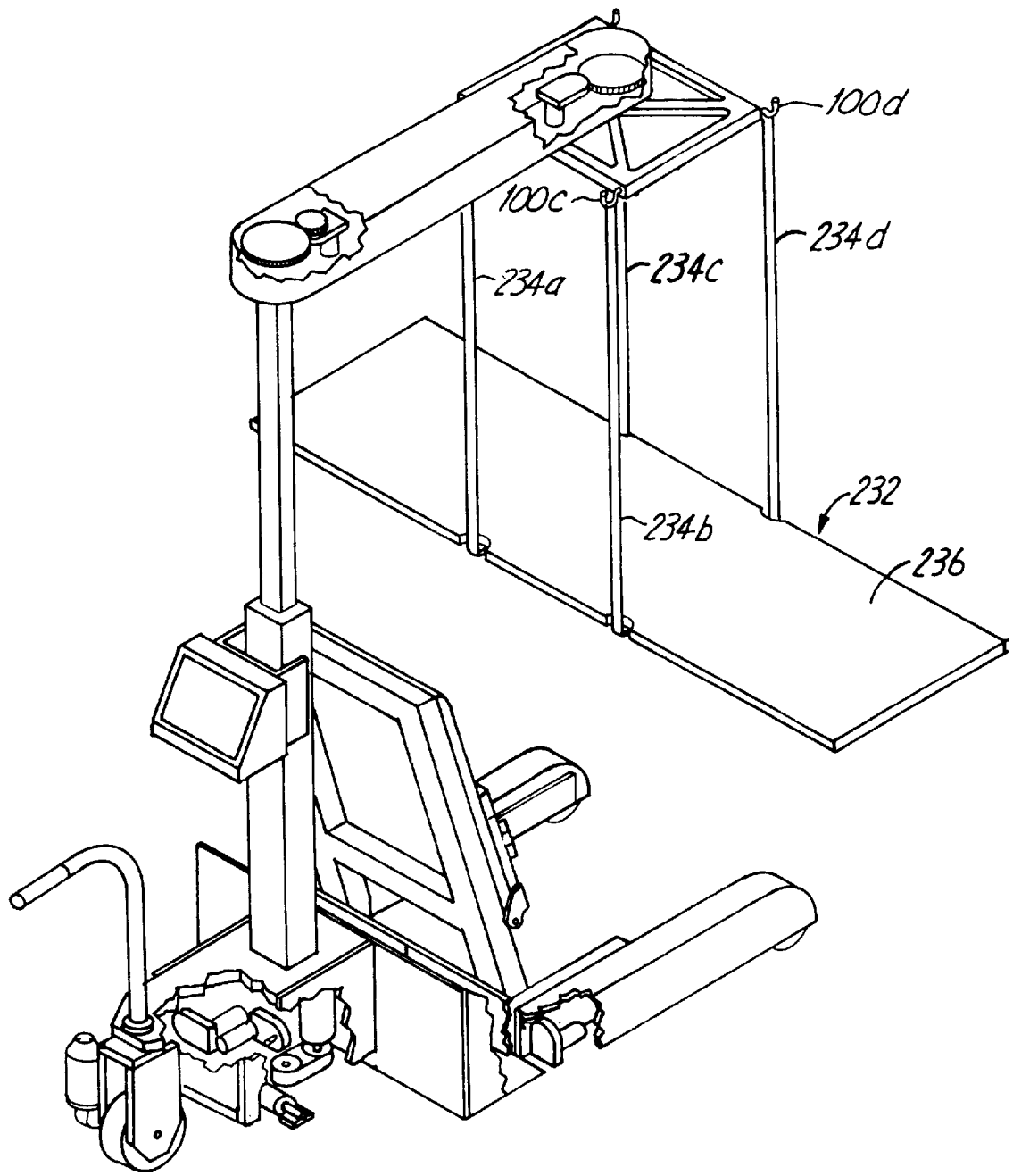
FIG. 3 shows a front perspective view of one other embodiment of the transporter of the present invention free of a shroud.

In one other embodiment, illustrated at 232 in FIG. 3, straps 234 a,b,c and d are suspended from hooks 100a–d. The straps 234a–d are of about the same length. The straps 234a–d suspend a rigid mat 236. An individual may be transported in a reclined position on the rigid mat 236.

The sling straps 96a–d are attachable to the sling strap spreader 88 at hooks 100a–d in the spreader 88. The hooks 100a–d are positioned at corners 98a–d of the sling strap spreader 88.

In one embodiment, the sling strap spreader 88 is also affixed with a weighing mechanism that is not shown. The weighing mechanism is used to weigh incapacitated individuals. In one embodiment, the weighing mechanism is a strain gauge. In another embodiment, the weighing mechanism is a load cell. Either of the strain gauge and load cell may be powered by the same circuit powering the lift and swivel motors.

Figure 14:
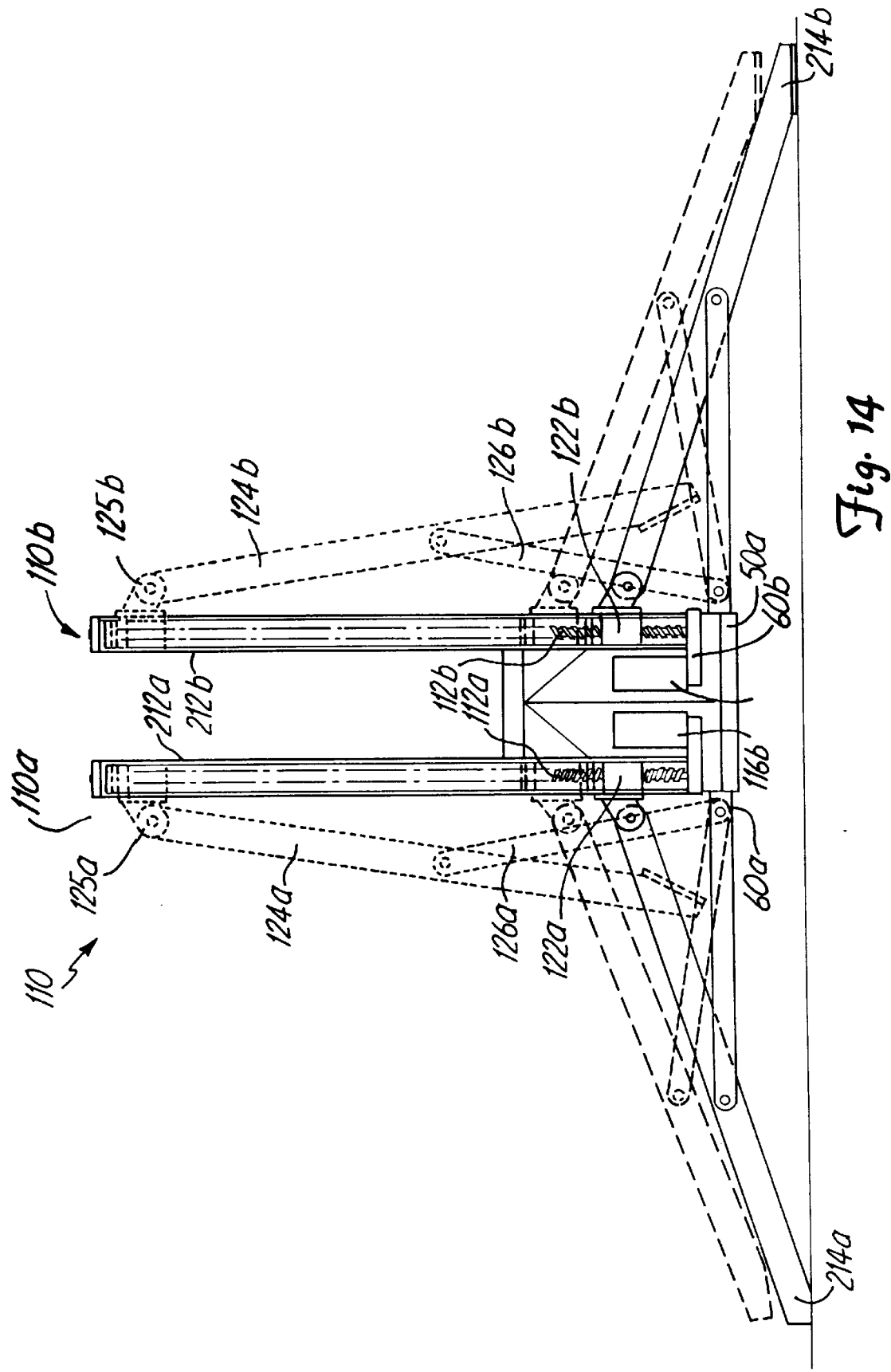
FIG. 14 shows a side view of one embodiment of a stabilizer mechanism for the transporter of the present invention.

The transporter 10 includes a stabilizing mechanism embodiment 110 with elements 110a and 110b as shown in FIGS. 1 and 14. The stabilizing mechanism 110 is shown in a retracted position in FIG. 1 and one extended, stabilizing position in FIG. 2. In preferred extended embodiments, the element 110a is extended when the arm 24 is pivoted in the direction of 110a. The element 110b remains retracted. Conversely, the element 110b is extended when the arm is pivoted toward 10b. The element 110a remains retracted.

The stabilizing mechanism element 110a in FIG. 14 includes a stabilizer screw 112a and element 110b includes a stabilizer screw 112b that opposes 112a. The stabilizer screws 112a and 112b are each attached at one end to a gear reducer 60a and 60b, respectively. The gear reducers 60a and 60b are coupled to motors 163 and 165 and are mounted on opposing sides of the lift mechanism housing 50a. Captured on each stabilizer screw 112a and 112b, respectively, is a stabilizer nut 122a and 122b laterally movable along the length of each screw 112a and 112b. Radial movement of each stabilizer screw 112a and 112b is translated to lateral movement by each of the nuts 122a and 122b. Stabilizer nut movement is stopped by limit switches at each end of each of the screws 112a and 112b.

Each of the stabilizer screws 112a and 112b is enclosed by a slotted housing 212a and 212b, respectively. A retractable leg section 124a and 124b is attached to each nut 122a and 122b at one end by a mechanism such as a link hinge 125a and 125b at a slot of the slotted housing 212a and 212b. Each of two forked bracing sections 126a and 126b is hingedly attached at 126a and 126b, respectively, attached about midlength, on each of the retractable leg sections 124a and 124b, respectively. The forked bracing sections 126a and 126b are also attached, at an opposing end, to the housing 50a. Each of the leg sections 124a and 124b terminates in a foot 214a and 214b, integral with the respective leg sections 124a and 124b.

As discussed, the stabilizer screws 112a and 112b are shown in an extended, stabilizing position in FIG. 2. In this position, the retractable leg sections 124a and 124b are moved toward a floor on the stabilizer screws 112a and 112b by movement of the nuts 122a and 122b. The leg sections 124a and 124b are positioned so that one end of each contacts the floor. The leg sections are braced by the forked bracing sections 126a and 126b.

The leg sections 124a and 124b may be retracted by moving the nuts 122a and 122b in a direction away from the floor. Upward movement of the nuts 122a and 122b moves each of the forked brace sections 126a and 126b upward as well.

The stabilizer mechanism 110 is automatically operated. The stabilizer screws 112a and 112b may be retracted from an extended position by actuation of a computer preprogram from control panel 93. In this embodiment, the nuts 122a and 122b are moved by radial movement of the stabilizer screws 112a and 112b. Movement of the stabilizer screws 112a and b is powered by motors 163 and 165.

The transporter device 10 is powered by two batteries of 12 volts with 124 amp.-hrs. per battery. The batteries feed a power distribution block such as is shown in schematic at 150 in FIG. 16. The feed from the batteries 152 to the power distribution block 150 includes an ON/OFF circuit breaker 154. The power distribution block 150 powers the computer 140 as well as control panel display 93 and the control grip 78. The power distribution block also powers a controller 162 for drive motor 74, a controller 156 for lift motor 80, a controller 158 for pivot motor 130, a controller 160 for swivel motor 136 as well as controllers 166 and 170 for each of two stabilizer motors 163 and 165. Each of the lift motor controller 156, pivot motor controller 158, swivel motor controller 160 and stabilizer motor controllers 166 and 170 may be controlled with switches.

In one preferred manual embodiment, shown in FIG. 2, the chair 18 is attached to slidable guides 59a and an opposing guide that is not shown. The slidable guides are held in place by guide housings 61a and 61b. The slidable guides 59a and the opposing guide that is not shown ride on cam followers that are not shown, that are glidably movable along tracks, 58a and 58b, within the guide housings 61a and 61b. The chair 18 may be stopped at each end of each of the tracks 58a and 58b by opposing slots 304, only one of which is shown in FIG. 2, that catch the cam followers.

The chair 18 includes a back support section 36 and a seat 21 hingedly attached to the back support section 36 as shown in FIGS. 2 and 11. In one embodiment, the seat 21 is spring biased in a position midway between an open and a closed position. With this bias, an incapacitated person can be easily positioned in the chair. Opposing arm rests 23a and 23b are pivotally attached to the seat 21.

The transporter device 10 of the present invention is easily controllable by an attendant in order to preposition a patient. The device 10 transports a patient from one room to another room by actuation of the drive wheel motor 74. The drive wheel motor 74 is actuated by either a clockwise or counterclockwise movement of the hand grip 78 attached to the steering tiller 76 by the attendant. The attendant may then concurrently move the drive wheel 68 while adjusting motor torque with the hand grip 78.

While being transported from one room to another room, the patient rests in the chair 18. Typically, the patient will sit upon the sling 95 while resting in the chair 18. The chair 18 may be either fully retracted as shown in FIG. 1 or extended as shown in FIGS. 2 and 10c.

Figure 10A:
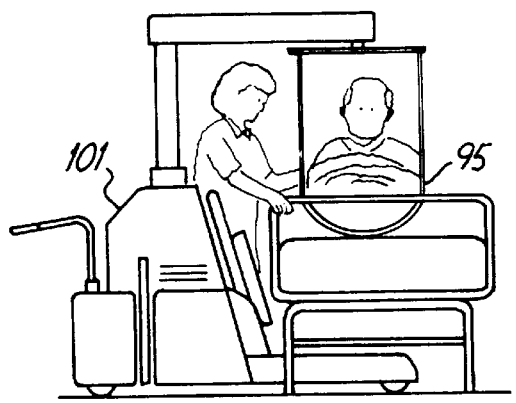
FIG. 10A shows one embodiment of the transporter of the present invention lifting a patient and moving the patient into a bed.
Figure 10B:
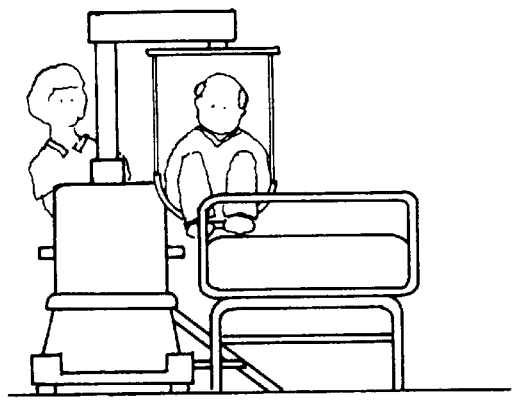
FIG. 10B shows one embodiment of the transporter of the present invention lifting a patient and moving the patient from the bed.
Figure 10C:
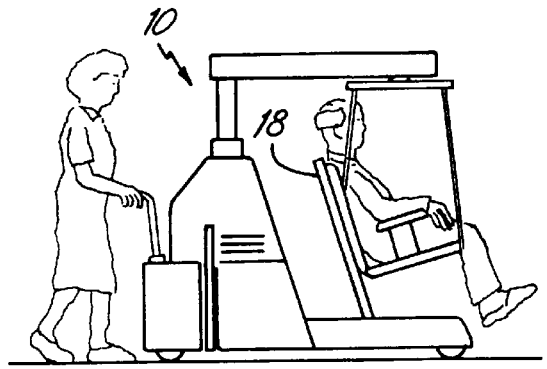
FIG. 10C shows one embodiment of the transporter of the present invention transporting the patient.
Figure 10D:
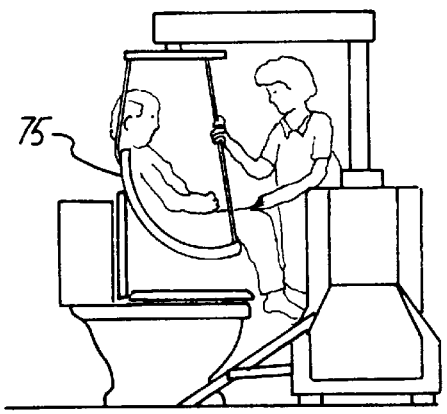
FIG. 10D shows one embodiment of the transporter of the present invention positioning the patient on a toilet.
Figure 10E:
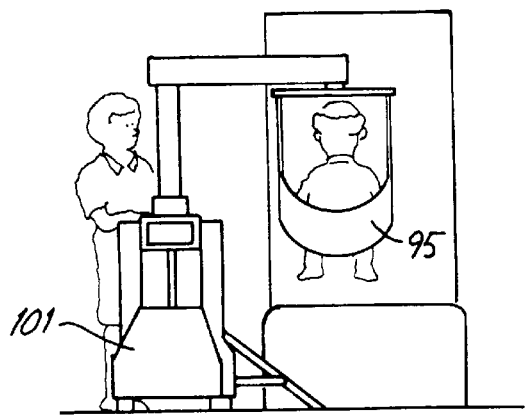
FIG. 10E shows one embodiment of the transporter of the present invention positioning the patient in a shower.

Once the patient is transported to a selected room in the transporter 10, the patient may be pre-positioned by the transporter 10 for transferring to a bed as shown in FIG. 10A, a toilet as shown in FIG. 10B or a bath as shown in FIG. 10E. To preposition the patient, the attendant positions the transporter by aligning the centering marker 200 on the shroud 101 of the transporter with a particular feature of a bed or toilet or shower. Once aligned, the attendant may actuate a program to position a patient on a toilet, in a bath or in a bed. The attendant may also manually actuate each of the lift, pivot and swivel mechanisms.

In one embodiment, the attendant actuates the lift assembly motor 80. The lift assembly motor 80 rotates the Acme screw 20. The rotational motion of the Acme screw 20 is translated to a lateral movement by the translating element 81. The vertical mast 87 increases the length of the vertical lift mechanism 14 and permits elevation of the patient. Once the lift mechanism 14 reaches the desired height, the lift mechanism motor 80 is shut off by the attendant pressing a switch on a tether. Alternately, the lift mechanism motor 80 may be manually adjusted to an OFF position from the control panel 93.

In another embodiment, the height of the lift mechanism 14 may be preprogrammed. A desired height is inputted into the computer at 140, shown schematically in the power block 150. In this embodiment, the attendant need only push a button on the control panel 93 in order to start a program that actuates the motor 80 at a predetermined speed for a predetermined time to adjust the lift mechanism 14 to a predetermined height. The time for extension is about 5 seconds.

Once the lift mechanism 14 is adjusted, the patient may be transferred from the chair 18 into a position of suspension in the sling 95, as shown in FIGS. 10A, 10B, 10D and 10E.

To pivot the patient when the patient is in the sling 95, one of the stabilizer elements 110a or 110b is extended. If the patient is pivoted right, the right stabilizer is extended. If the patient is pivoted left, the left stabilizer is extended. Once the stabilizer is positioned, the patient may be slowly rotated by actuation of the pivot mechanism. The lift arm 14 may rotate slowly within an arc of up to about 90°. The lift arm 14 rotates about the arc in order to position the patient over a bed as shown in FIG. 10A, a toilet as shown in FIG. 10D or in a bath as shown in 10E.

Substantially simultaneously as the patient is rotated, the patient may be swiveled about the swivel column 25 by actuation of the swivel motor 136. The swivel motor 136 actuation moves the swivel column 25 to a degree that permits the patient to be precisely positioned so that his or her legs and feet face a desired direction for bed, toilet, or bath. Touching a "Head left" switch 222 orients a patient's head to face left. Touching a "Head right" switch 224 orients a patient's head to face right. The swivel motor 136 and the pivot motor 130 may be manually operated or may be preprogrammed by the computer 140 in the manner described for the lift assembly motor 80.

In one embodiment, the patient in sling 95 is lifted from the bed by actuating hand held control switch 86 on tethered panel 196 which energizes motor 80 thereby turning screw 20 translated to vertical movement by element 81. The transporter 10 is moved away from the bed with the chair 18 moved to its extended position as shown in FIG. 2. When the "TRANSPORT" program is actuated, the patient is automatically swiveled to a feet forward position and is lowered into the chair 18 for transporting to its destination.

The control panel 93 preferably includes a conventional membrane non-permeable graphic overlay. The control panel 93 includes switches having a polydomed tactile feedback. Preferably, the display of the panel is a back-lighted window mask. When a program switch is touched by an attendant, the switch initiates control to execute a sequence of preprogrammed actions.

One of the activatable preprogrammed tasks, identified as "Return to Start", is on the control panel 93 at 174. Once this program is actuated, the lift arm 14 pivots to a "front" position such as is shown in FIG. 1. The chair 18 is manually retracted by the attendant to a collapsed position. The lift arm 14 lowers to its lowest point. The swivel column 25 is returned to a center position. Stabilizers 110a and 110b are retracted against the shroud 101. When these events have occurred, the drive control 78 is provided with power. The transporter vehicle 10 may be advanced by an attendant when the handgrip 78 is gripped and moved in either a clockwise or counterclockwise direction.

In a "Transport" program, actuated by actuator 176 on the control panel 93, the arm 14 is pivoted to a front position as shown in FIG. 1. The swivel column 25 is rotated 90°, clockwise or counterclockwise depending upon the patient's head position, left or right. This program orients a patient's feet to a front position. The chair 18 is moved by the attendant to a full extended position. The arm 14 automatically lowers the patient to the chair 18. When complete, the drive control grip 78 is provided with power.

Another preprogram is the "Prepare to Bed" program. This program may be actuated by touching actuator 178 on control panel 93. When this program is actuated, the arm 14 is raised to its highest point. The swivel column 25 is rotated 90° to place a patient's head at a front position. The chair 18 is manually retracted to a collapsed position. The drive control 78 is then powered.

The control panel 93 also includes a "toilet pivot left" program that can be actuated by touching 184. With this program, a stabilizer 110a on the left hand side of the transporter 10 extends to an end limit with its leg section planted. If an obstruction interferes with full stabilizer 110a extension, the stabilizer 110 retracts to a home position and registers a "footing obstruction" notice on the control panel display 186. It is then necessary to move the transporter unit 10 to clear the unit of the obstruction. Once the obstruction is cleared, the "pivot left" program can be executed. Once the stabilizer extension step is complete, the arm 14 is raised to a top limit. Next, the arm 14 is pivoted left 90°. The swivel column 25 and sling 95 swivel clockwise as determined by one looking down on the transporter 10 from overhead, 180°. When both the pivot step and swivel step are completed, the arm 14 lowers a patient to a toilet. Once lowered, the bottom of the sling 95 is at a height of a toilet seat. In one embodiment, this is a distance of about 19 inches from a floor.

The control panel 93 also includes a "toilet pivot right" actuator at 188. This control scheme is the same as the "pivot left" control with the difference that movements are made in mirror image to those of the "toilet pivot left" program. While specific programs have been described, it is understood that other programs may be inputted into and performed by the transporter 10.

A "Bath Pivot Left" actuator 228 and a "Bath Pivot Right" actuator 230 each actuate a program with steps that are the same as those for the "Toilet Pivot Left" and "Toilet Pivot Right" preprograms. The preprograms differ in that the degree of movement of the arm and swivel mechanisms is adjusted to accommodate specific dimensions.

An operator may change limits on any of the motor controllers by accessing the computer through a keyboard attached to the computer 140, shown schematically at 192. The keyboard may be attached to the transporter 10. Alternatively, the keyboard 192 may be remote from the transporter 10.

The control panel 93 includes a first section 194 for automatic control of the transporter 10 and a second section 196 for a semi-manual control of the transporter 10. The first section 194 may be the keyboard 192. The automatic control panel section 194 also includes auxiliary switches 180 and 182 for use as needed, a brake switch 220, for braking the drive motor 74. The transporter 10 program may be stopped by pressing the "Stop" switch 226.

The manual control panel section 196 includes switches for moving the acme screw up and down 86, for moving the swivel column 25 left or right 142, or moving the pivot arm left or right 130. The manual control panel section 196 also includes a "stop" button.

Batteries 152 that power the transporter 10 are preferably recharged by an induction coil-based battery charger. In one embodiment, the transporter 10 does not have an OFF/ON switch and is always, effectively, ON. One embodiment of the induction coil-based battery charger is shown at 310 in FIGS. 18 and 19. The induction coil-based battery charger 310 includes an input inductor 314 mounted on a positioning brace 316 and a transporter inductor 312 mounted on the transporter 10. Preferably, the transporter inductor 312 is mounted on one of the wheel housings 34, adjacent to the chair 18 as shown in FIG. 18. The input inductor 314 is connected to an alternating current power source (not shown).

The input inductor 314 preferably contacts the transporter inductor 312 at 316 when the transporter 10 is being charged. Typically, the input inductor 314 includes a steel core with a coil around the core connected to the alternating current power source. The transporter inductor 312 includes a saturable steel core around which a coil is wound. The inductor 312 also includes output leads connected to a capacitor in an output circuit. The alternating current passes from the input inductor 314 to the transporter inductor 312, through a direct current rectifier to a battery charging circuit.

The input 314 and transporter 312 inductors are coupled by mutual magnetic flux through the steel cores, inducing voltage in each turn of the transporter inductor coil, proportional to the magnetic flux.

The cores of each of the inductors includes a plurality of magnetically permeable sheets held closely enough together to form an electromagnetic flux path.

Figure 20:
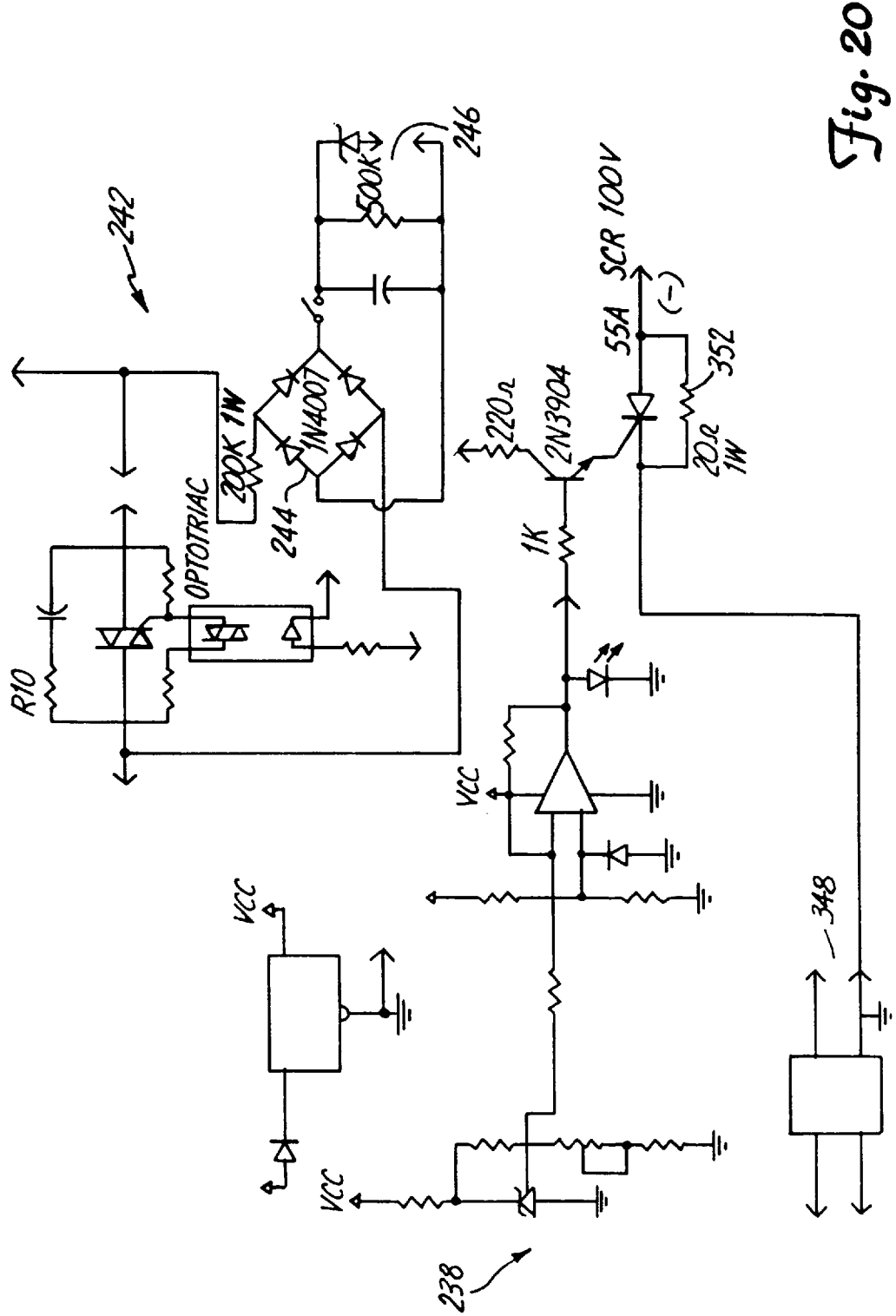
FIG. 20 is a schematic electrical view of the induction coil battery charger for the transporter.

An electrical schematic of a transporter induction circuit is shown at 238 in FIG. 20. The transporter induction circuit includes a conventional high current trip mechanism 240. The electrical schematic also shows an input inductor circuit at 242 in FIG. 20. The input inductor circuit 242 plugs into an outlet (not shown). A switch 244 is positioned on the positioning brace 316. A time delay circuit 246 energizes the transporter circuit 238. The time delay circuit 246 prevents energizing before the transporter and input inductors 312 and 314 contact each other. The battery contacts 348 and 352 are part of the transporter circuit 238.

For use in a typical 8 hour day, it is contemplated that the transporter 10 will consume about 1000 watts of power. With this consumption, the battery charger can recharge the batteries in about 8 hours, based upon an efficiency of 85 to 90%.

Although the present invention has been described with reference to preferred embodiments, workers skilled in the art will recognize that changes may be made in form and detail without departing from the spirit and scope of the invention.

What is claimed is:

1. A device for controllably moving a three-wheel vehicle that includes a drive wheel, comprising:

a drive motor that provides energy for moving the drive wheel;

a steering tiller conjoined to the drive wheel for changing vehicle direction;

a control grip attached to the steering tiller for increasing and decreasing power to the drive motor, the control grip comprising a potentiometric main body for acceleration control of the drive motor and a control shaft that encloses the main body wherein the control shaft moves clockwise and counter-clockwise about the main body, the control grip further comprising a single spring attached to the control shaft, the single spring positioned in an annulus between the control shaft and the main body, wherein the spring applies a tension to the control shaft when the control shaft is moved clockwise and counter-clockwise.

2. The device of claim 1 wherein the spring is a half-coil spring.

3. The device of claim 1 wherein the spring is a quarter-coil spring.

* * * * *